(12) United States Patent
Kontomaris

(10) Patent No.: US 10,590,808 B2
(45) Date of Patent: *Mar. 17, 2020

(54) PROCESSES AND COMPOSITIONS FOR ORGANIC RANKINE CYCLES FOR GENERATING MECHANICAL ENERGY FROM HEAT

(71) Applicant: THE CHEMOURS COMPANY FC, LLC, Wilmington, DE (US)

(72) Inventor: Konstantinos Kontomaris, Wilmington, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 350 days.

This patent is subject to a terminal disclaimer.

(21) Appl. No.: 15/420,759

(22) Filed: Jan. 31, 2017

(65) Prior Publication Data

US 2017/0138223 A1    May 18, 2017

Related U.S. Application Data

(62) Division of application No. 14/237,571, filed as application No. PCT/US2012/051239 on Aug. 16, 2012, now Pat. No. 9,593,599.

(Continued)

(51) Int. Cl.
*F01K 25/08* (2006.01)
*C09K 5/04* (2006.01)
*F01K 25/10* (2006.01)

(52) U.S. Cl.
CPC .............. *F01K 25/08* (2013.01); *C09K 5/045* (2013.01); *C09K 5/048* (2013.01); *F01K 25/10* (2013.01);

(Continued)

(58) Field of Classification Search
CPC .......... C09K 2205/126; C09K 2205/22; C09K 2205/24; C09K 5/045; C09K 5/048;

(Continued)

(56) References Cited

U.S. PATENT DOCUMENTS 3,332,826 A   7/1967  Johnson
4,142,108 A   2/1979  Matthews
(Continued)

FOREIGN PATENT DOCUMENTS

JP    2010-048129 A    3/2010
WO    2007/053697 A2   5/2007
(Continued)

OTHER PUBLICATIONS

Peter Nijhuijs, Authorized Officer, International PCT Search Report and Written Opinion for Application No. PCT/US2012/051239, dated Mar. 18, 2014.

(Continued)

*Primary Examiner* — Jesse S Bogue

(57) ABSTRACT

Disclosed are compositions of novel working fluids uniquely designed for higher cycle efficiencies leading to higher overall system efficiencies. In particular, these working fluids are useful in Organic Rankine Cycle systems for efficiently converting heat from any heat source into mechanical energy. The present invention also relates to novel processes for recovering heat from a heat source using ORC systems with a novel working fluid comprising at least about 20 weight percent cis-1,1,1,4,4,4-hexafluoro-2-butene (HFO-1336mzz-Z), trans-1,1,1,4,4,4-hexafluoro-2-butene (HFO-1336mzz-E), or mixtures thereof.

16 Claims, 8 Drawing Sheets

Related U.S. Application Data

(60) Provisional application No. 61/525,531, filed on Aug. 19, 2011.

(52) U.S. Cl.
    CPC .... *C09K 2205/126* (2013.01); *C09K 2205/22* (2013.01); *C09K 2205/24* (2013.01); *Y02P 20/123* (2015.11); *Y02P 20/124* (2015.11); *Y02P 20/544* (2015.11)

(58) Field of Classification Search
    CPC ........ F01K 25/08; F01K 25/10; Y02P 20/123; Y02P 20/124; Y02P 20/544
    See application file for complete search history.

(56) References Cited

U.S. PATENT DOCUMENTS

| | | | | |
|---|---|---|---|---|
| 8,024,937 | B2* | 9/2011 | Minor | C09K 5/045 62/115 |
| 8,881,523 | B2* | 11/2014 | Kasuya | F01K 13/02 60/618 |
| 9,157,018 | B2* | 10/2015 | Rached | A61Q 13/00 |
| 2008/0168772 | A1 | 7/2008 | Radcliff et al. | |
| 2008/0289334 | A1* | 11/2008 | Orosz | F03G 6/067 60/641.8 |
| 2009/0012335 | A1 | 1/2009 | Nappa et al. | |
| 2010/0127208 | A1* | 5/2010 | Nappa | C09K 5/045 252/67 |
| 2010/0154419 | A1 | 6/2010 | Kontomaris | |
| 2010/0263380 | A1 | 10/2010 | Biederman et al. | |
| 2010/0326095 | A1 | 12/2010 | Van Horn et al. | |
| 2011/0144216 | A1* | 6/2011 | Hulse | C11D 7/02 514/757 |
| 2012/0004299 | A1* | 1/2012 | Hulse | A62D 1/0057 514/475 |
| 2012/0042669 | A1 | 2/2012 | Minor et al. | |
| 2012/0117991 | A1 | 5/2012 | Rached | |
| 2012/0159976 | A1 | 6/2012 | Kontomaris | |
| 2012/0266597 | A1 | 10/2012 | Freund et al. | |
| 2013/0014509 | A1* | 1/2013 | Perico | F01K 7/02 60/643 |
| 2014/0048739 | A1 | 2/2014 | Rached et al. | |
| 2016/0014509 | A1 | 1/2016 | Hansson et al. | |
| 2016/0096218 | A1 | 4/2016 | Griswold et al. | |

FOREIGN PATENT DOCUMENTS

| | | |
|---|---|---|
| WO | 2010/141669 A1 | 12/2010 |
| WO | 2011/084447 A2 | 7/2011 |

OTHER PUBLICATIONS

ANSI/ASHRAE Standard 97-2007, Sealed Glass Tube Method to Test the Chemical Stability of Materials for Use within Refrigerant Systems, Approved American National Standard (ANSI), American Society of Heating, Refrigerating and Air- Conditioning Engineers, Inc. (ASHRAE), 2007, Atlanta, Georgia.

Joost J. Brasz, et al., Power Production from a Moderate-Temperature Geothermal Resource, GRC Annual Meeting, Sep. 25-28, 2005, Reno, Nevada.

Adelina P. Davis, et al., Geothermal power production from abandoned oil wells, Journal of Energy, 2009, pp. 866-872, vol. 34, Elsevier Ltd.

M. F. Doherty, et al., Conceptual Design of Distillation Systems, 2001, Chapter 5: Homogeneous Azeotropic Distillation, pp. 185-186 and Chapter 8: Heterogeneous Azeotropic Distillation, pp. 351-359.

Musthafah Tahir, et al., Efficiency of Compact Organic Rankine Cycle System with Rotary-Vane-Type Expander for Low-Temperature Waste Heat Recovery, International Journal of Civil and Environmental Engineering, 2010, pp. 11-16, vol. 2:1.

Phil Welch and Patrick Boyle, New Turbines to Enable Efficient Geothermal Power Plants, GRC Transactions, 2009, pp. 765-772, vol. 33.

http://www.chemicalbook.com/ChemicalProductProperty_EN_CB8467094.htm, 1,1,1,4,4,4-HEXAFLUORO-2-Butene Synonyms.

Kontomaris, Konstantinos, "*HFO-1336mzz-Z as a Low GWP Working Fluid for Transcritical Rankine Power Cycles*", 6 pages; presented at the 2014 JRAIA International Symposium (held Nov. 20-21, 2014 in Kobe, Japan, a symposium for new refrigerants and environmental technology) © JRAIA.

* cited by examiner

PROCESSES AND COMPOSITIONS FOR ORGANIC RANKINE CYCLES FOR GENERATING MECHANICAL ENERGY FROM HEAT

This application represents a divisional application of U.S. application Ser. No. 14/237,571, filed Feb. 7, 2014, which is a national filing under 35 U.S.C. 371 of International Application No. PCT/US12/51239, filed Aug. 16, 2012, and claims priority benefit of U.S. Provisional Application No. 61/525,531, filed Aug. 19, 2011.

BACKGROUND

1. Field of the Disclosure

The present invention generally relates to novel working fluids uniquely designed for reduced impact on climate change and higher cycle efficiencies, thereby leading to higher overall system efficiencies. In particular, these working fluids are useful in Organic Rankine Cycle (ORC) systems for efficiently converting heat from various heat sources into mechanical energy. The present invention also relates to novel processes for recovering heat from a heat source using ORC systems with a novel working fluid comprising at least about 20 weight percent cis-1,1,1,4,4,4-hexafluoro-2-butene (HFO-1336mzz-Z), trans-1,1,1,4,4,4-hexafluoro-2-butene (HFO-1336mzz-E), or mixtures thereof.

2. Description of Related Art

Previous Rankine Cycle systems have used various working fluids including flammable or combustible working fluids-fluids with relatively high toxicity, fluids with relatively high global warming potentials (GWPs) and fluids with non-zero ozone depletion potentials (ODPs). Industry has been working on replacing ozone-depleting chlorofluorocarbons (CFCs) and hydrochlorofluorocarbons (HCFCs). Non-flammable, low toxicity, environmentally sustainable working fluids are highly desirable for Rankine Cycle applications.

It has been found that surprisingly, the novel working fluids of the present invention uniquely provide higher cycle efficiencies in ORC systems that in turn result in higher overall system efficiencies in the power cycle while offering low toxicity, no flammability, zero ODP, and very low GWP.

SUMMARY OF THE INVENTION

In one embodiment, this invention relates to a process for recovering heat from a heat source and generating mechanical energy, comprising the steps of:
(a) passing a first working fluid in liquid phase through a heat exchanger or an evaporator, wherein said heat exchanger or said evaporator is in communication with said heat source that supplies said heat;
(b) removing at least a portion of said first working fluid in a vapor phase from said heat exchanger or said evaporator;
(c) passing said at least a portion of said first working fluid in vapor phase to an expander, wherein at least portion of said heat is converted into mechanical energy;
(d) passing said at least a portion of said first working fluid in vapor phase from said expander to a condenser, wherein said at least a portion of said first working fluid in vapor phase is condensed to a second working fluid in liquid phase;
(e) optionally, compressing and mixing said second working fluid in liquid phase with said first working fluid in liquid phase in Step (a); and
(f) optionally, repeating Steps (a) through (e), at least one time;
wherein at least about 20 weight percent of said first working fluid comprises HFO-1336mzz-Z, HFO-1336mzz-E, or mixtures thereof.

This invention further relates to a process for recovering heat from a heat source and generating mechanical energy, comprising the steps of:
(a) compressing a first working fluid in liquid phase above said first working fluid's critical pressure;
(b) passing said first working fluid from Step (a) through a heat exchanger or a fluid heater and heating said first working fluid to a temperature that is higher or lower than the critical temperature of said first working fluid, wherein said heat exchanger or said fluid heater is in communication with said heat source that supplies said heat;
(c) removing at least a portion of the heated said first working fluid from said heat exchanger fluid heater;
(d) passing said at least a portion of the heated said first working fluid to an expander,
wherein at least portion of said heat is converted into mechanical energy, and
wherein the pressure on said first at least a portion of the heated said first working fluid is reduced to below the critical pressure of said first working fluid, thereby rendering said at least a portion of the heated said first working fluid to a first working fluid vapor or a first working fluid mixture of vapor and liquid;
(e) passing said first working fluid vapor or said first working fluid mixture of vapor and liquid from said expander to a condenser, wherein said at least a portion of said working fluid vapor or said working fluid mixture of vapor and liquid is fully condensed to a second working fluid in liquid phase;
(f) optionally, compressing and mixing said second working fluid in liquid phase with said first working fluid in liquid phase in Step (a);
(g) optionally, repeating Steps (a) through (f), at least one time;
wherein at least about 20 weight percent of said first working fluid comprises HFO-1336mzz-Z, HFO-1336mzz-E, or mixtures thereof.

In one embodiment, this invention further relates to a composition comprising HFO-1336mzz-Z at a temperature in the range of from about 250° C. to about 300° C., wherein said HFO-1336mzz-Z content is in the range of from about 50 weight percent to about 99.5 weight percent.

In yet another embodiment, this invention relates to an Organic Rankine Cycle System extracting heat at an operating pressure in the range from about 3 MPa to about 10 MPa, wherein about 20 weight percent of said working fluid comprises HFO-1336mzz-Z, HFO-1336mzz-E, or mixtures thereof.

In another embodiment, this invention relates to a composition as working fluid for power cycles, wherein the temperature of said composition is in the range of from about 50° C. to about 400° C., and wherein about 20 weight percent of said composition comprises HFO-1336mzz-Z, HFO-1336mzz-E, or mixtures thereof.

In another embodiment, this invention relates to a method for replacing HFC-245fa in a power cycle system. The method comprises removing said HFC-245fa from said power cycle system and charging said system with a working fluid comprising HFO-1336mzz-Z, HFO-1336mzz-E, or mixtures thereof.

DETAILED DESCRIPTION

Figure 1:
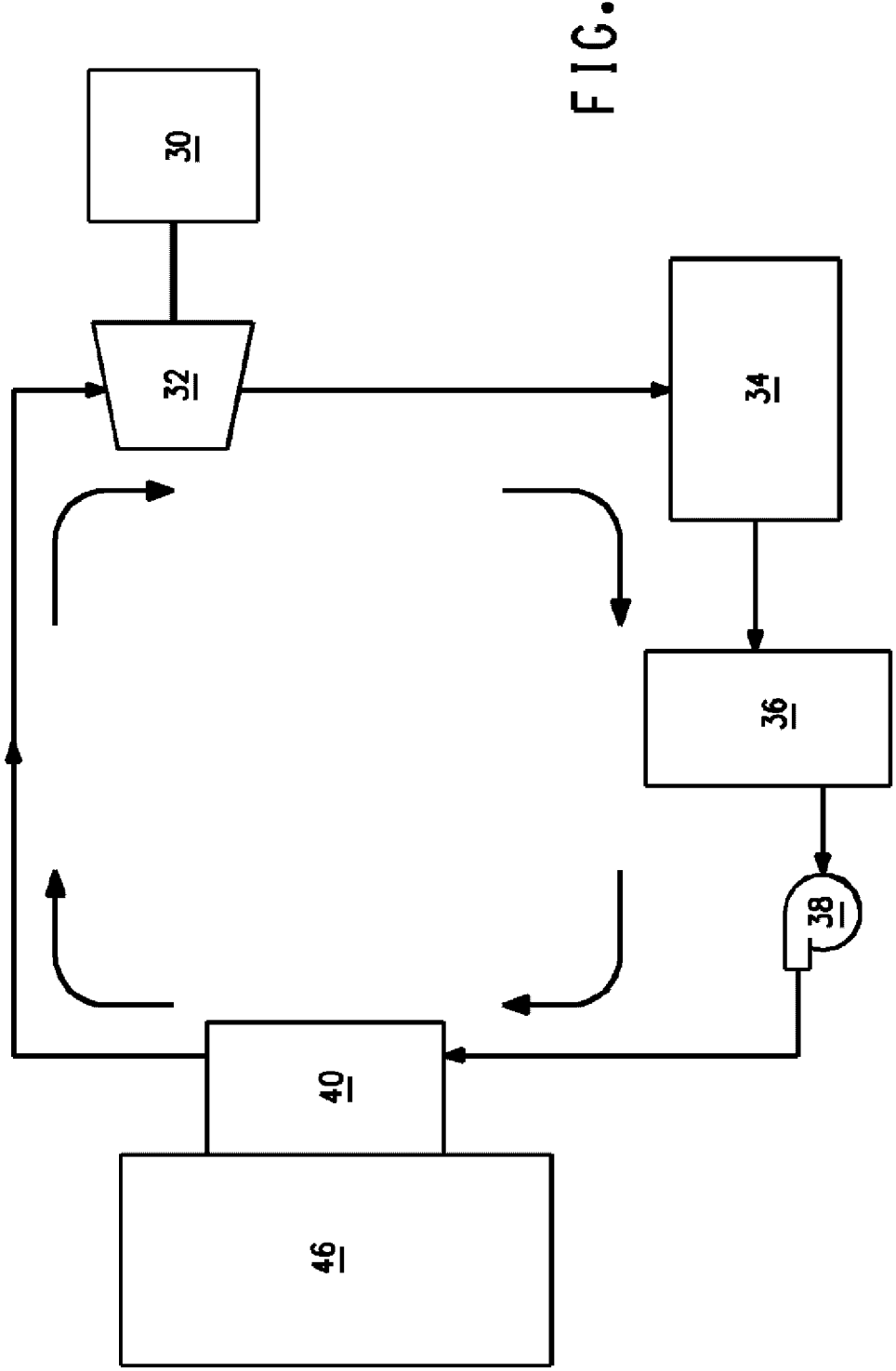
FIG. 1 is a block diagram of a heat source and an organic Rankine cycle system in direct heat exchange according to the present invention.

Global warming potential (GWP) is an index for estimating relative global warming contribution due to atmospheric emission of a kilogram of a particular greenhouse gas compared to emission of a kilogram of carbon dioxide. GWP can be calculated for different time horizons showing the effect of atmospheric lifetime for a given gas. The GWP for the 100 year time horizon is commonly the value referenced.

Net cycle power output is the rate of mechanical work generation at the expander (e.g., a turbine) less the rate of mechanical work consumed by the compressor (e.g., a liquid pump).

Volumetric capacity for power generation is the net cycle power output per unit volume of working fluid (as measured at the conditions at the expander outlet) circulated through the cycle.

Cycle efficiency (also referred to as thermal efficiency) is the net cycle power output divided by the rate at which heat is received by the working fluid during the heating stage.

Subcooling is the reduction of the temperature of a liquid below that liquid's saturation point for a given pressure. The saturation point is the temperature at which a vapor composition is completely condensed to a liquid (also referred to as the bubble point). But subcooling continues to cool the liquid to a lower temperature liquid at the given pressure. Subcool amount is the amount of cooling below the saturation temperature (in degrees) or how far below its saturation temperature a liquid composition is cooled.

Superheat is a term that defines how far above its saturation temperature (the temperature at which, if the composition is cooled, the first drop of liquid is formed, also referred to as the "dew point") a vapor composition is heated.

Temperature glide (sometimes referred to simply as "glide") is the absolute value of the difference between the starting and ending temperatures of a phase-change process by a refrigerant within a component of a refrigerant system, exclusive of any subcooling or superheating. This term may be used to describe condensation or evaporation of a near azeotrope or non-azeotropic composition. Average glide refers to the average of the glide in the evaporator and the glide in the condenser of a specific chiller system operating under a given set of conditions.

The term "dry" as used in relation to "a dry expansion", for instance, is meant to mean an expansion that takes place entirely in the vapor phase with no liquid working fluid present. Thus, "dry" as used herein does not relate to the presence or absence of water.

An azeotropic composition is a mixture of two or more different components which, when in liquid form under a given pressure, will boil at a substantially constant temperature, which temperature may be higher or lower than the boiling temperatures of the individual components, and which will provide a vapor composition essentially identical to the overall liquid composition undergoing boiling. (see, e.g., M. F. Doherty and M. F. Malone, Conceptual Design of Distillation Systems, McGraw-Hill (New York), 2001, 185-186, 351-359).

Accordingly, the essential features of an azeotropic composition are that at a given pressure, the boiling point of the liquid composition is fixed and that the composition of the vapor above the boiling composition is essentially that of the overall boiling liquid composition (i.e., no fractionation of the components of the liquid composition takes place). It is also recognized in the art that both the boiling point and the weight percentages of each component of the azeotropic composition may change when the azeotropic composition is subjected to boiling at different pressures. Thus, an azeotropic composition may be defined in terms of the unique relationship that exists among the components or in terms of the compositional ranges of the components or in terms of exact weight percentages of each component of the composition characterized by a fixed boiling point at a specified pressure.

For the purpose of this invention, an azeotrope-like composition means a composition that behaves substantially like an azeotropic composition (i.e., has constant boiling characteristics or a tendency not to fractionate upon boiling or evaporation). Hence, during boiling or evaporation, the vapor and liquid compositions, if they change at all, change only to a minimal or negligible extent. This is to be contrasted with non-azeotrope-like compositions in which during boiling or evaporation, the vapor and liquid compositions change to a substantial degree.

As used herein, the terms "comprises," "comprising," "includes," "including," "has," "having" or any other variation thereof, are intended to cover a non-exclusive inclusion. For example, a composition, process, method, article, or apparatus that comprises a list of elements is not necessarily limited to only those elements but may include other elements not expressly listed or inherent to such composition, process, method, article, or apparatus. Further, unless expressly stated to the contrary, "or" refers to an inclusive or and not to an exclusive or. For example, a condition A or B is satisfied by any one of the following: A is true (or present)

and B is false (or not present), A is false (or not present) and B is true (or present), and both A and B are true (or present).

The transitional phrase "consisting of" excludes any element, step, or ingredient not specified. If in the claim such would close the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" is used to define a composition, method or apparatus that includes materials, steps, features, components, or elements, in addition to those literally disclosed provided that these additional included materials, steps, features, components, or elements do materially affect the basic and novel characteristic(s) of the claimed invention. The term 'consisting essentially of' occupies a middle ground between "comprising" and 'consisting of'.

Where applicants have defined an invention or a portion thereof with an open-ended term such as "comprising," it should be readily understood that (unless otherwise stated) the description should be interpreted to also describe such an invention using the terms "consisting essentially of" or "consisting of."

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

E-1,1,1,4,4,4-hexafluoro-2-butene (also known as HFO-1336mzz-E or trans-HFO-1336mzz and having the structure E-CF$_3$CH=CHCF$_3$) and Z-1,1,1,4,4,4-hexafluoro-2-butene (also known as HFO-1336mzz-Z or cis-HFO-1336mzz and having the structure Z—CF$_3$CH=CHCF$_3$), may be made by methods known in the art, such as by hydrodechlorination of 2,3-dichloro-1,1,1,4,4,4-hexafluoro-2-butene, as described in U.S. Patent Application Publication No. US 2009/0012335 A1, incorporated herein by reference.

Processes for Recovering Heat or Converting Heat into Mechanical Energy

For the purposes of the present invention, transcritical Organic Rankine Cycle is defined as an Organic Rankine Cycle which extracts heat at a pressure higher than the critical pressure of the working fluid used in the cycle.

In one embodiment, the present invention relates to novel processes for recovering heat from a heat source and generating mechanical energy using Organic Rankine Cycle ("ORC") systems which employ a novel working fluid.

In one embodiment, the above process for recovering heat from a heat source and generating mechanical energy, comprises the following steps:

(a) passing a first working fluid in liquid phase through a heat exchanger or an evaporator, wherein said heat exchanger or said evaporator is in communication with said heat source that supplies said heat;

(b) removing at least a portion of said first working fluid in a vapor phase from said heat exchanger or said evaporator;

(c) passing said at least a portion of said first working fluid in vapor phase to an expander, wherein at least portion of said heat is converted into mechanical energy;

(d) passing said at least a portion of said first working fluid in vapor phase from said expander to a condenser, wherein said at least a portion of said first working fluid in vapor phase is condensed to a second working fluid in liquid phase;

(e) optionally, compressing and mixing said second working fluid in liquid phase with said first working fluid in liquid phase in Step (a); and (f) optionally, repeating Steps (a) through (e), at least one time;

wherein at least about 20 weight percent of said first working fluid comprises HFO-1336mzz-Z, HFO-1336mzz-E, or mixtures thereof. In another embodiment, the first working fluid comprises at least 30 weight percent HFO-1336mzz-Z, HFO-1336mzz-E, or mixtures thereof. In another embodiment, the first working fluid comprises at least 40 weight percent HFO-1336mzz-Z, HFO-1336mzz-E, or mixtures thereof. In another embodiment, the first working fluid comprises at least 50 weight percent HFO-1336mzz-Z, HFO-1336mzz-E, or mixtures thereof.

The working fluid described above comprises at least about 20 weight percent cis-1,1,1,4,4,4-hexafluoro-2-butene (HFO-1336mzz-Z), or at least about 20 weight percent trans-1,1,1,4,4,4-hexafluoro-2-butene (HFO-1336mzz-E), or at least about 20 weight percent of a mixture thereof. In another embodiment, the working fluid comprises at least 30 weight percent HFO-1336mzz-Z, HFO-1336mzz-E, or mixtures thereof. In another embodiment, the working fluid comprises at least 40 weight percent HFO-1336mzz-Z, HFO-1336mzz-E, or mixtures thereof. In another embodiment, the working fluid comprises at least 50 weight percent HFO-1336mzz-Z, HFO-1336mzz-E, or mixtures thereof. In a suitable embodiment, said at least about 20 weight percent cis-1,1,1,4,4,4-hexafluoro-2-butene (HFO-1336mzz-Z), or said at least about 20 weight percent trans-1,1,1,4,4,4-hexafluoro-2-butene (HFO-1336mzz-E), or said at least about 20 weight percent of a mixture thereof is selected from the following percentage content of the working fluid:

about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 50.5, 51, 52, 52.5, 53, 53.5, 54, 54.5, 55, 55.5, 56, 56.5, 57, 57.5, 58, 58.5, 59, 59.5, 60, 60.5, 61, 61.5, 62, 62.5, 63, 63.5, 64, 64.5, 65, 65.5, 66, 66.5, 67, 67.5, 68, 68.5, 69, 69.5, 70, 70.5, 71, 71.5, 72, 72.5, 73, 73.5, 74, 74.5, 75, 55.5, 76, 76.5, 77, 77.5, 78, 78.5, 79, 79.5, 80, 80.5, 81, 81.5, 82, 82.5, 83, 83.5, 84, 84.5, 85, 85.5, 86, 86.5, 87, 87.5, 88, 88.5, 89, 89.5, 90, 90.5, 91, 91.5, 92, 92.5, 93, 93.5, 94, 94.5, 95, 95.5, 96, 96.5, 97, 97.5, 98, 98.5, 99, 99.5, and about 100%.

In another suitable embodiment, said at least about 20 weight percent cis-1,1,1,4,4,4-hexafluoro-2-butene (HFO-1336mzz-Z), or said at least about 20 weight percent trans-1,1,1,4,4,4-hexafluoro-2-butene (HFO-1336mzz-E), or said at least about 20 weight percent of a mixture thereof is selected from a range defined by any two percentage numbers above (inclusive of endpoints).

In one embodiment of the above process, wherein the working fluid comprises a mixture of HFO-1336mzz-Z and HFO-1336mzz-E, the working fluid comprises at least about 10 weight percent HFO-1336mzz-E and 90 or more weight percent HFO-1336mzz-Z. In another embodiment, wherein the working fluid comprises a mixture of HFO-1336mzz-Z and HFO-1336mzz-E, the working fluid comprises at least about 15 weight percent HFO-1336mzz-E and 85 or more weight percent HFO-1336mzz-Z. In another embodiment, wherein the working fluid comprises a mixture of HFO-1336mzz-Z and HFO-1336mzz-E, the working fluid comprises at least about 20 weight percent HFO-1336mzz-E and 80 or more weight percent HFO-1336mzz-Z. In another embodiment, wherein the working fluid comprises a mixture of HFO-1336mzz-Z and HFO-1336mzz-E, the working fluid comprises at least about 25 weight percent HFO-1336mzz-E and 75 or more weight percent HFO-1336mzz-Z. In another embodiment, wherein the working fluid comprises a mixture of HFO-1336mzz-Z and HFO-1336mzz-E, the working fluid comprises from about 25 weight percent to about 75 weight percent HFO-1336mzz-E and from about 75 weight percent to about 25 weight percent HFO-1336mzz-Z.

The working fluid can also comprise less than about 80 weight percent of one or more of other components selected from the following:

cis-HFO-1234ze; trans-HFO-1234ze; HFO-1234yf; HFO-1234ye-E or Z; HFO 1225ye(Z); HFO-1225ye (E); HFO-1225yc; HFO-1243zf (3,3,3-trifluoropropene); HFO-1233zd-E or Z; HFO-1233xf; $CF_3CH=CHCF_3$ (E); $(CF_3)_2CFCH=CHF$ (E & Z); $(CF_3)_2CFCH=CF_2$; $CF_3CHFC=CHF$ (E & Z); $(C_2F_5)(CF_3)C=CH_2$; HFC-245fa; HFC-245eb; HFC-245ca; HFC-245cb; HFC-227ea; HFC-236cb; HFC-236ea; HFC-236fa; HFC-365mfc; HFC-43-10mee; $CHF_2—O—CHF_2$; $CHF_2—O—CH_2F$; $CH_2F—O—CH_2F$; $CH_2F—O—CH_3$; cyclo-$CF_2—CH_2—CF_2—O$; cyclo-$CF_2—CF_2—CH_2—O$; $CHF_2—O—CF_2—CHF_2$; $CF_3—CF_2—O—CH_2F$; $CHF_2—O—CHF—CF_3$; $CHF_2—O—CF_2—CHF_2$; $CH_2F—O—CF_2—CHF_2$; $CF_3—O—CF_2—CH_3$; $CHF_2—CHF—O—CHF_2$; $CF_3—O—CHF—CH_2F$; $CF_3—CHF—O—CH_2F$; $CF_3—O—CH_2—CHF_2$; $CHF_2—O—CH_2—CF_3$; $CH_2F—CF_2—O—CH_2F$; $CHF_2—O—CF_2—CH_3$; $CHF_2—CF_2—O—CH_3$; $CH_2F—O—CHF—CH_2F$; $CHF_2—CHF—O—CH_2F$; $CF_3—O—CHF—CH_3$; $CF_3—CHF—O—CH_3$; $CHF_2—O—CH_2—CHF_2$; $CF_3—O—CH_2—CH_2F$; $CF_3—CH_2—O—CH_2F$; $CF_2H—CF_2—CF_2—O—CH_3$; propane; cyclopropane; butane; isobutane; n-pentane; isopentane; neopentane; cyclopentane; n-hexane; isohexane; heptane; trans-1,2-dichloroethylene, and mixtures with cis-HFO-1234ze and HFC-245fa.

In one embodiment, the working fluid comprises 80 weight percent or less of at least one of the above compounds. In another embodiment, the working fluid comprises 70 weight percent or less of at least one of the above compounds. In another embodiment, the working fluid comprises 60 weight percent or less of at least one of the above compounds. In another embodiment, the working fluid comprises 50 weight percent or less of at least one of the above compounds.

In one embodiment, the working fluid for extracting heat may consist of HFO-1336mzz-Z. In another embodiment, the working fluid for extracting heat may consist of HFO-1336mzz-E. In another embodiment, the working fluid for extracting heat may consist of a mixture of HFO-1336mzz-Z and HFO-1336mzz-E.

Note that while the working fluid in the process description above is identified as a "first" working fluid and as a "second" working fluid, it should be understood that the difference between the two working fluids is only that the first working fluid is the fluid that enters the ORC system while the second working fluid is the fluid that enters the ORC system after it has undergone at least one step of the process outlined in above.

In one embodiment of the above process, the efficiency of converting heat to mechanical energy (cycle efficiency) is at least about 7%. In a suitable embodiment, the efficiency can be selected from the following:

about 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, and about 25%.

In another embodiment, the efficiency is selected from a range that has endpoints (inclusive) as any two efficiency numbers supra. It is to be understood that the instantaneous efficiency of the ORC system may vary at any given time depending upon the several variables in the ORC system such as the source temperature and the pressure of the working fluid and its temperature.

In one embodiment of the above process, the working fluid is HFO-1336mzz-Z with minimum amounts of other components, and the evaporator operating temperature (highest temperature at which heat is extracted by the working fluid) is less than or equal to about 171° C. In a suitable embodiment, the temperature of operation can be any one of the following temperatures or within the range (inclusive) defined by any two numbers below:

about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, and about 163, 164, 165, 166, 167, 168, 169, 170, and about 171° C.

In another embodiment of the above process, the working fluid is primarily HFO-1336mzz-E, and the evaporator operating temperature (highest temperature at which heat is extracted by the working fluid) is less than or equal to about 137° C. In a suitable embodiment, the temperature of operation can be any one of the following temperatures or within the range (inclusive) defined by any two numbers below:

about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, and about 137° C.

In another embodiment, the working fluid is a mixture of HFO-1336mzz-Z and HFO-1336mzz-E and the evaporator operating temperature (highest temperature at which heat is extracted by the working fluid) is in the range from about 137° C. to about 171° C.

In one embodiment of the above process, the evaporator operating pressure is less than about 2.5 MPa. In a suitable embodiment, the pressure of operation can be any one of the following pressures or within the range (inclusive) defined by any two numbers below:

about 1.00, 1.05, 1.10, 1.15, 1.20, 1.25, 1.30, 1.35, 1.40, 1.45, 1.50, 1.55, 1.60, 1.65, 1.70, 1.75, 1.80, 1.85, 1.90, 1.95, 2.00, 2.05, 2.10, 2.15, 2.20, 2.25, 2.30, 2.35, 2.40, 2.45, and about 2.50 MPa.

In one embodiment of the above process, said working fluid has a GWP of less than 35. In a suitable embodiment, the GWP can be any one of the following numbers or within the range (inclusive) defined by any two numbers below:

5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, 30, 30.5, 31, 31.5, 32, 32.5, 33, 33.5, 34, 34.5, and about 35.

FIG. 1 shows a schematic of one embodiment of the ORC system for using heat from a heat source. A heat supply heat exchanger 40 transfers heat supplied from a heat source 46 to the working fluid entering the heat supply heat exchanger 40 in liquid phase. The heat supply heat exchanger 40 is in thermal communication with the source of heat (the communication may be by direct contact or another means). In other words, the heat supply heat exchanger 40 receives heat energy from the heat source 46 by any known means of thermal transfer. The ORC system working fluid circulates through the heat supply heat exchanger 40 where it gains heat. At least a portion of the liquid working fluid converts to vapor in the heat supply heat exchanger (an evaporator, in some cases) 40.

The working fluid now in vapor form is routed to the expander 32 where the expansion process results in conversion of at least a portion of the heat energy supplied from the heat source into mechanical energy, usually shaft energy. Shaft power can be used to do any mechanical work by employing conventional arrangements of belts, pulleys, gears, transmissions or similar devices depending on the desired speed and torque required. In one embodiment, the shaft can also be connected to an electric power-generating device 30 such as an induction generator. The electricity produced can be used locally or delivered to a grid.

The working fluid still in vapor form that exits the expander 32 continues to the condenser 34 where adequate heat rejection causes the fluid to condense to liquid.

It is also desirable to have a liquid surge tank 36 located between the condenser 34 and pump 38 to ensure there is always an adequate supply of working fluid in liquid form to the pump suction. The working fluid in liquid form flows to a pump 38 that elevates the pressure of the fluid so that it can be introduced back into the heat supply heat exchanger 40 thus completing the Rankine cycle loop.

Figure 2:
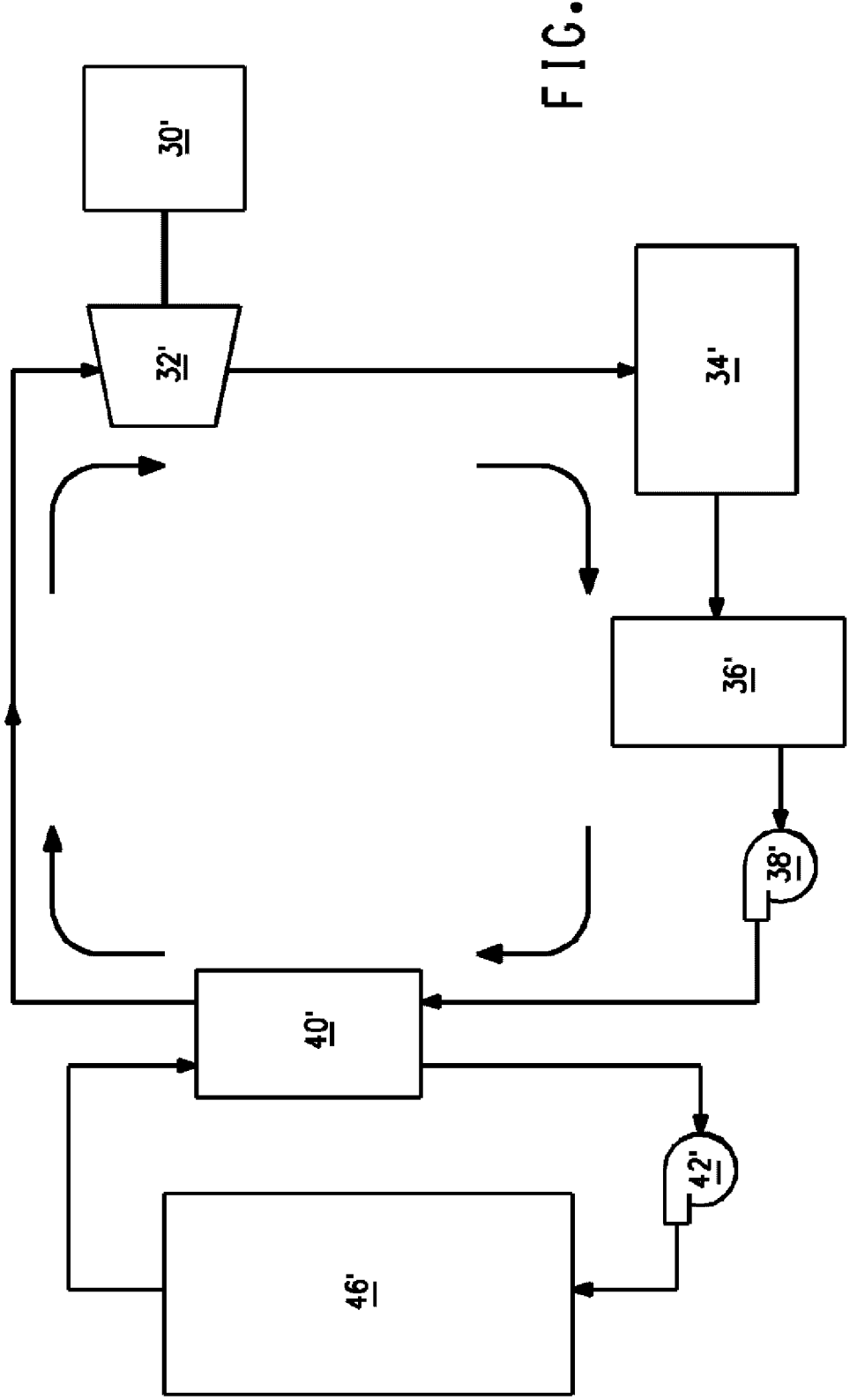
FIG. 2 is a block diagram of a heat source and an organic Rankine cycle system which uses a secondary loop configuration to provide heat from a heat source to a heat exchanger for conversion to mechanical energy according to the present invention.

In an alternative embodiment, a secondary heat exchange loop operating between the heat source and the ORC system can also be used. In FIG. 2, an organic Rankine cycle system is shown using a secondary heat exchange loop. The main organic Rankine cycle operates as described above for FIG. 1. The secondary heat exchange loop shown in FIG. 2 operates as follows: the heat from the heat source 46' is transported to the heat supply heat exchanger 40' using a heat transfer medium (i.e., secondary heat exchange loop fluid). The heat transfer medium moves from the heat supply heat exchanger 40' to a pump 42' that pumps the heat transfer medium back to the heat source 46'. This arrangement offers another means of removing heat from the heat source and delivering it to the ORC system. This arrangement provides flexibility by facilitating the use of various fluids for sensible heat transfer. In fact, the working fluids of this invention can be used as secondary heat exchange loop fluids provided the pressure in the loop is maintained at or above the fluid saturation pressure at the temperature of the fluid in the loop. Alternatively, the working fluids of this invention can be used as secondary heat exchange loop fluids or heat carrier fluids to extract heat from heat sources in a mode of operation in which the working fluids are allowed to evaporate during the heat exchange process thereby generating large fluid density differences sufficient to sustain fluid flow (thermosyphon effect). Additionally, high-boiling point fluids such as glycols, brines, silicones, or other essentially non-volatile fluids may be used for sensible heat transfer in the secondary loop arrangement described. High-boiling point fluids may be those fluids with boiling points of 150° C. or higher. A secondary heat exchange loop can make servicing of either the heat source or the ORC system easier since the two systems can be more easily isolated or separated. This approach can simplify the heat exchanger design as compared to the case of having a heat exchanger with a high mass flow/low heat flux portion followed by a high heat flux/low mass flow portion.

Organic compounds often have an upper temperature limit above which thermal decomposition will occur. The onset of thermal decomposition relates to the particular structure of the chemical and thus varies for different compounds. In order to access a high-temperature source using direct heat exchange with the working fluid, design considerations for heat flux and mass flow, as mentioned above, can be employed to facilitate heat exchange while maintaining the working fluid below its thermal decomposition onset temperature. Direct heat exchange in such a situation typically requires additional engineering and mechanical features which drive up cost. In such situations, a secondary loop design may facilitate access to the high-temperature heat source by managing temperatures while circumventing the concerns enumerated for the direct heat exchange case.

Other ORC system components for the secondary heat exchange loop embodiment are essentially the same as described for FIG. 1. As shown in FIG. 2, a liquid pump 42' circulates the secondary fluid (e.g., heat transfer medium) through the secondary loop so that it enters the portion of the loop in the heat source 46' where it gains heat. The fluid then passes to the heat exchanger 40' where the secondary fluid gives up heat to the ORC working fluid.

In yet another embodiment, the present invention relates to the novel working fluid uniquely designed for higher cycle efficiencies in power cycles, thereby leading to higher overall system efficiencies. In particular, these working fluids are useful in Organic Rankine Cycle ("ORC") systems for efficiently converting heat from various heat sources into mechanical energy. This working fluid is described above.

Transcritical Organic Rankine Cycles

In one embodiment, organic Rankine cycles are transcritical cycles. Therefore, the present invention relates to a process for recovering heat from a heat source, comprising the following steps:

(a) compressing a first working fluid in liquid phase above said first working fluid's critical pressure;

(b) passing said first working fluid from Step (a) through a heat exchanger or a fluid heater and heating said first working fluid to a temperature that is higher or lower than the critical temperature of said first working fluid, wherein said heat exchanger or said fluid heater is in communication with said heat source that supplies said heat;

(c) removing at least a portion of the heated said first working fluid from said heat exchanger or fluid heater;

(d) passing said at least a portion of the heated said first working fluid to an expander, wherein at least portion of said heat is converted into mechanical energy, and wherein the pressure on said at least a portion of the heated said first working fluid is reduced to below the critical pressure of said first working fluid, thereby rendering said at least a portion of the heated said first working fluid to a first working fluid vapor or a first working fluid mixture of vapor and liquid;

(e) passing said first working fluid vapor or said first working fluid mixture of vapor and liquid from said expander to a condenser, wherein said at least a portion of said working fluid vapor or said working fluid mixture of vapor and liquid is fully condensed to a second working fluid in liquid phase;

(f) optionally, compressing and mixing said second working fluid in liquid phase with said first working fluid in liquid phase in Step (a);

(g) optionally, repeating Steps (a) through (f), at least one time;

wherein at least about 20 weight percent of said first working fluid comprises HFO-1336mzz-Z, HFO-1336mzz-E, or mixtures thereof. In another embodiment, the first working fluid comprises at least 30 weight percent HFO-1336mzz-Z, HFO-1336mzz-E, or mixtures thereof. In another embodiment, the first working fluid comprises at least 40 weight percent HFO-1336mzz-Z, HFO-1336mzz-E, or mixtures thereof. In another embodiment, the first working fluid comprises at least 50 weight percent HFO-1336mzz-Z, HFO-1336mzz-E, or mixtures thereof.

In one embodiment of the above process, wherein the working fluid comprises a mixture of HFO-1336mzz-Z and HFO-1336mzz-E, the working fluid comprises at least about 10 weight percent HFO-1336mzz-E and 90 or more weight percent HFO-1336mzz-Z. In another embodiment, wherein the working fluid comprises a mixture of HFO-1336mzz-Z and HFO-1336mzz-E, the working fluid comprises at least about 15 weight percent HFO-1336mzz-E and 85 or more weight percent HFO-1336mzz-Z.

In another embodiment, wherein the working fluid comprises a mixture of HFO-1336mzz-Z and HFO-1336mzz-E, the working fluid comprises at least about 20 weight percent HFO-1336mzz-E and 80 or more weight percent HFO-1336mzz-Z. In another embodiment, wherein the working fluid comprises a mixture of HFO-1336mzz-Z and HFO-1336mzz-E, the working fluid comprises at least about 25 weight percent HFO-1336mzz-E and 75 or more weight percent HFO-1336mzz-Z. In another embodiment, wherein the working fluid comprises a mixture of HFO-1336mzz-Z and HFO-1336mzz-E, the working fluid comprises from about 25 weight percent to about 75 weight percent HFO-1336mzz-E and from about 75 weight percent to about 25 weight percent HFO-1336mzz-Z.

In one embodiment of the above process, the efficiency of converting heat to mechanical energy (cycle efficiency) is at least about 7%. In a suitable embodiment, the efficiency can be selected from the following:

about 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, and about 25%.

In another embodiment, the efficiency is selected from a range that has endpoints (inclusive) as any two efficiency numbers supra.

The working fluid described above comprises at least about 20 weight percent cis-1,1,1,4,4,4-hexafluoro-2-butene (HFO-1336mzz-Z), or at least about 20 weight percent trans-1,1,1,4,4,4-hexafluoro-2-butene (HFO-1336mzz-E), or at least about 20 weight percent of a mixture thereof. In a suitable embodiment, said at least about 20 weight percent cis-1,1,1,4,4,4-hexafluoro-2-butene (HFO-1336mzz-Z), or said at least about 20 weight percent trans-1,1,1,4,4,4-hexafluoro-2-butene (HFO-1336mzz-E), or said at least about 20 weight percent of a mixture thereof is selected from the following percentage content of the working fluid:

about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 50.5, 51, 52, 52.5, 53, 53.5, 54, 54.5, 55, 55.5, 56, 56.5, 57, 57.5, 58, 58.5, 59, 59.5, 60, 60.5, 61, 61.5, 62, 62.5, 63, 63.5, 64, 64.5, 65, 65.5, 66, 66.5, 67, 67.5, 68, 68.5, 69, 69.5, 70, 70.5, 71, 71.5, 72, 72.5, 73, 73.5, 74, 74.5, 75, 55.5, 76, 76.5, 77, 77.5, 78, 78.5, 79, 79.5, 80, 80.5, 81, 81.5, 82, 82.5, 83, 83.5, 84, 84.5, 85, 85.5, 86, 86.5, 87, 87.5, 88, 88.5, 89, 89.5, 90, 90.5, 91, 91.5, 92, 92.5, 93, 93.5, 94, 94.5, 95, 95.5, 96, 96.5, 97, 97.5, 98, 98.5, 99, 99.5, and about 100 weight percent.

In another suitable embodiment, said at least about 20 weight percent cis-1,1,1,4,4,4-hexafluoro-2-butene (HFO-1336mzz-Z), or said at least about 20 weight percent trans-1,1,1,4,4,4-hexafluoro-2-butene (HFO-1336mzz-E), or said at least about 20 weight percent of a mixture thereof is selected from a range defined by any two percentage numbers above (inclusive of endpoints).

In one embodiment, the working fluid for extracting heat may consist of HFO-1336mzz-Z. In another embodiment, the working fluid for extracting heat may consist of HFO-1336mzz-E. In another embodiment, the working fluid for extracting heat may consist of a mixture of HFO-1336mzz-Z and HFO-1336mzz-E.

It is to be noted that at higher temperatures of operation the cis-1,1,1,4,4,4-hexafluoro-2-butene (HFO-1336mzz-Z) in the working fluid may undergo an isomerization to its trans isomer, that is, trans-1,1,1,4,4,4-hexafluoro-2-butene (HFO-1336mzz-E). It was found surprisingly that such isomerization can be minimal even at higher temperatures such as 250° C.

The working fluid can also comprise less than about 80 weight percent of one or more of other components selected from the following:

cis-HFO-1234ze; trans-HFO-1234ze; HFO-1234yf; HFO-1234ye-E or Z; HFO-1225ye(Z); HFO-1225ye (E); HFO-1243zf (3,3,3-trifluoropropene); HFO1225yc; HFO-1233zd-E or Z; HFC-1233xf; $CF_3CH=CHCF_3$ (E); $(CF_3)_2CFCH=CHF$ (E & Z); $(CF_3)_2CFCH=CF_2$; $CF_3CHFC=CHF$ (E & Z); $(C_2F_5)(CF_3)C=CH_2$; HFC-245fa; HFC-245eb; HFC-245ca; HFC-245cb; HFC-227ea; HFC-236cb; HFC-236ea; HFC-236fa; HFC-365mfc; HFC-43-10mee; $CH_2$—O—$CHF_2$; $CHF_2$—O—$CH_2F$; $CH_2F$—O—$CH_2F$; $CH_2F$—O—$CH_3$; cyclo-$CF_2$—$CH_2$—$CF_2$—O; cyclo-$CF_2$—$CF_2$—$CH_2$—O; $CHF_2$—O—$CF_2$—$CHF_2$; $CF_3$—$CF_2$—O—$CH_2F$; $CHF_2$—O—CHF—$CF_3$; $CHF_2$—O—$CF_2$—$CHF_2$; $CH_2F$—O—$CF_2$—$CHF_2$; $CF_3$—O—$CF_2$—$CH_3$; $CHF_2$—CHF—O—$CHF_2$; $CF_3$—O—CHF—$CH_2F$; $CF_3$—CHF—O—$CH_2F$; $CF_3$—O—$CH_2$—$CHF_2$; $CHF_2$—O—$CH_2$—$CF_3$; $CH_2F$—$CF_2$—O—$CH_2F$; $CHF_2$—O—$CF_2$—$CH_3$; $CHF_2$—$CF_2$—O—$CH_3$; $CH_2F$—O—CHF—$CH_2F$; $CHF_2$—CHF—$OCH_2F$; $CF_3$—O—CHF—$CH_3$; $CF_3$—CHF—O—$CH_3$; $CHF_2$—O—$CH_2$—$CHF_2$; $CF_3$—O—$CH_2$—$CH_2F$; $CF_3$—$CH_2$—O—$CH_2F$; $CF_2H$—$CF_2$—$CF_2$—O—$CH_3$; propane; cyclopropane; butane; isobutane; n-pentane; isopentane; neopentane; cyclopentane; n-hexane; isohexane; heptane; trans-1,2-dichloroethylene, and mixtures with cis-HFO-1234ze and HFC-245fa.

In one embodiment of the above process, the working fluid comprises 80 weight percent or less of at least one of the above compounds. In another embodiment, the working fluid comprises 70 weight percent or less of at least one of the above compounds. In another embodiment, the working fluid comprises 60 weight percent or less of at least one of the above compounds. In another embodiment, the working fluid comprises 50 weight percent or less of at least one of the above compounds.

Note that while the working fluid in the process description above is identified as a "first" working fluid and as a "second" working fluid, it should be understood that the difference between the two working fluids is only that the first working fluid is what enters the ORC system while the second working fluid is the one that has undergone at least one step of the process outlined in above.

In one embodiment of the above process, the temperature to which the first working fluid is heated in Step (b) is in the range of from about 50° C. to about 400° C., preferably from about 150° C. to about 300° C., more preferably from about 175° C. to 275° C., more preferably from about 200° C. to 250° C.

In a suitable embodiment, the temperature of operation at the expander inlet can be any one of the following temperatures or within the range (inclusive) defined by any two numbers below:

about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151,152, 153, 154, 155, 156, 157, 158, 159, 160, 161, 162, and about 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201,202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 323, 323, 324, 325, 326, 327, 328, 329, 330, 331, 323, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400° C.

In one embodiment of the above process, the working fluid in Step (a) is pressurized in the range of from about 3 MPa to about 10 MPa. In a suitable embodiment, the pressure of operation can be any one of the following pressures or within the range (inclusive) defined by any two numbers below:

about 3.0, 3.1, 3.2, 3.3, 3.4, 3.5, 4.0, 4.5, 5.0, 5.5, 6.0, 6.5, 7.0, 7.5, 8.0, 8.5, 9.0, 9.5, and 10.0 MPa.

In one embodiment of the above process, said working fluid has a GWP of less than 35. In a suitable embodiment, the GWP can be any one of the following numbers or within the range (inclusive) defined by any two numbers below:

5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, 30, 30.5, 31, 31.5, 32, 32.5, 33, 33.5, 34, 34.5, and about 35.

In the first step of the transcritical Organic Rankine Cycle (ORC) system, described above, the working fluid in liquid phase comprising at least about 20 weight percent cis-1,1,1,4,4,4-hexafluoro-2-butene (HFO-1336mzz-Z), or at least about 20 weight percent trans-1,1,1,4,4,4-hexafluoro-2-butene (HFO-1336mzz-E), or at least about 20 weight percent of a mixture thereof, is compressed to above its critical pressure. The critical pressure of HFO-1336mzz-Z is 2.903 MPa; the critical pressure of HFO-1336mzz-E is 3.149 MPa. In a second step, said working fluid is passed through a heat exchanger to be heated to a higher temperature before the fluid enters the expander wherein said heat exchanger is in thermal communication with said heat source. In other words, the heat exchanger receives heat energy from the heat source by any known means of thermal transfer. The ORC system working fluid circulates through the heat recovery heat exchanger where it gains heat.

In the next step, at least a portion of the heated said first working fluid is removed from said heat exchanger. The working fluid is routed to the expander where the expansion process results in conversion of at least portion of the energy content of the working fluid into mechanical energy, often shaft energy. Shaft power can be used to do any mechanical work by employing conventional arrangements of belts, pulleys, gears, transmissions or similar devices depending on the desired speed and torque required. In one embodiment, the shaft can also be connected to an electric power-generating device such as an induction generator. The electricity produced can be used locally or delivered to the grid. The pressure on the working fluid is reduced to below critical pressure of said working fluid, thereby rendering the working fluid to a first working fluid in vapor phase.

In the next step, the working fluid now in vapor phase is passed from the expander to a condenser, wherein the working fluid in vapor phase is condensed to the working fluid in liquid phase. The above steps form a loop system and can be repeated many times.

Exemplar 1—Transcritical ORC: Totally Dry Expansion

Figure 5:
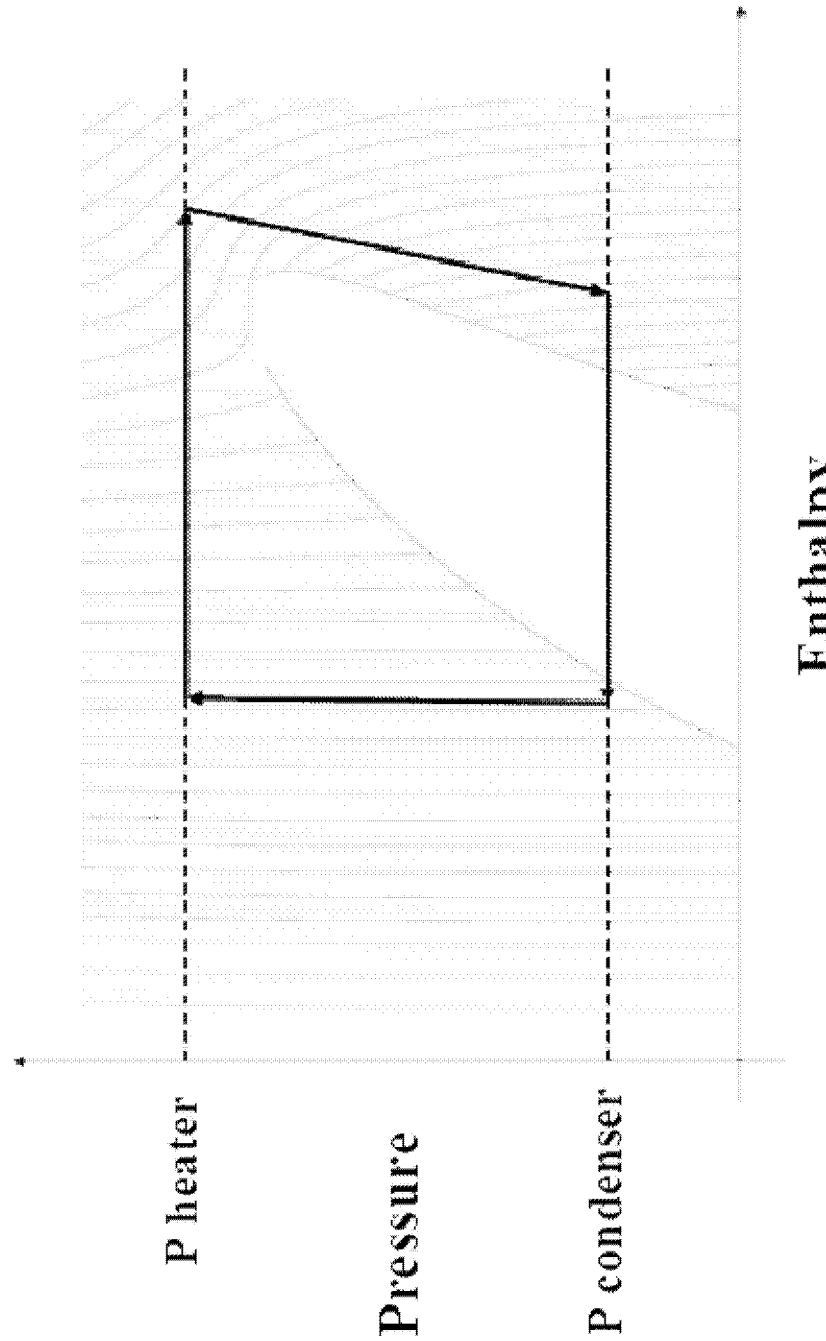
FIG. 5 shows a transcritical ORC with a completely dry expansion.

FIG. 5 shows one embodiment of the present invention, wherein a transcritical ORC is used. FIG. 5 is a pressure-enthalpy diagram for the cycle of this embodiment. The substantially vertical lines on the plot are isentropic lines. The lines that are vertical on the left half of the curve but start showing deviation and curvature on the right half of the plot are isothermal lines. The broken line on the left side of the dome shape is the saturated liquid line. The broken line on the right side of the dome shape is the saturated vapor line. In the first step, the working fluid is compressed (pressurized) above the critical pressure of the working fluid usually substantially isentropically. It is then heated under a substantially constant pressure (isobaric) condition to a temperature above its critical temperature. In the next step, the working fluid is expanded usually substantially isentropically. The fluid temperature is reduced during the expansion step below its critical temperature. The fluid at the end of the expansion step is in a superheated vapor state. In the next step, the working fluid is cooled and condensed and heat is rejected and its temperature is reduced. The working fluid passes through two phase change boundaries, the saturated vapor curve, shown on the right side, and then the saturated liquid curve on the left. The working fluid is in a slightly subcooled liquid state at the end of this step.

Figure 6:
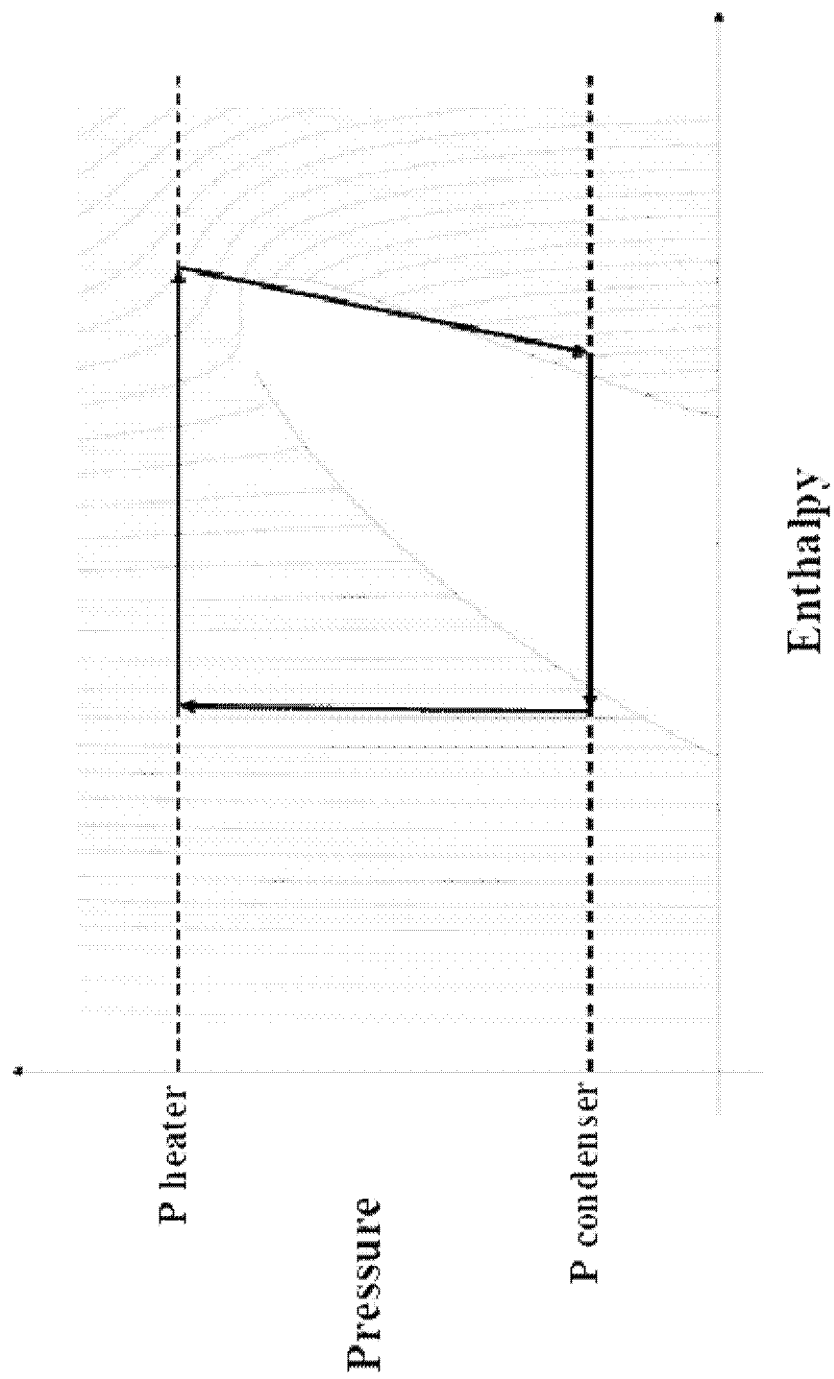
FIG. 6 shows a transcritical ORC with partial condensation during expansion but dry vapor at the expander exit.

Exemplar 2—Transcritical ORC; Partial Condensation During Expansion/Dry Vapor at Expander Exit FIG. 6 shows one embodiment of the present invention, wherein a transcritical ORC is used. FIG. 6 is a pressure-enthalpy diagram for the cycle of this embodiment. The substantially vertical lines on the plot are isentropic lines. The lines that are vertical on the left half of the curve but start showing deviation and curvature on the right half of the plot are isothermal lines. The broken line on the left side of the dome shape is the saturated liquid line. The broken line on the right side of the dome shape is the saturated vapor line. In the first step, the working fluid is compressed (pressurized) above the critical pressure of the working fluid, usually substantially isentropically. It is then heated under a substantially constant pressure condition to a temperature above its critical temperature.

The working fluid temperature is above its critical temperature only to such an extent that in the next step, when the working fluid is expanded usually substantially isentropically, and its temperature is reduced, the isentropic expansion approximately tracks the saturated vapor curve in such fashion that the expansion results in partial condensation or misting of the working fluid. At the end of this expansion step, however, the working fluid is in a superheated vapor state, that is, its locus is on the right side of the saturated vapor curve.

In the next step, the working fluid is cooled and condensed and heat is rejected and its temperature is reduced. The working fluid passes through two phase change boundaries, the saturated vapor curve, shown on the right side, and then the saturated liquid curve on the left. The working fluid is in a slightly subcooled liquid state at the end of this step.

Figure 7:
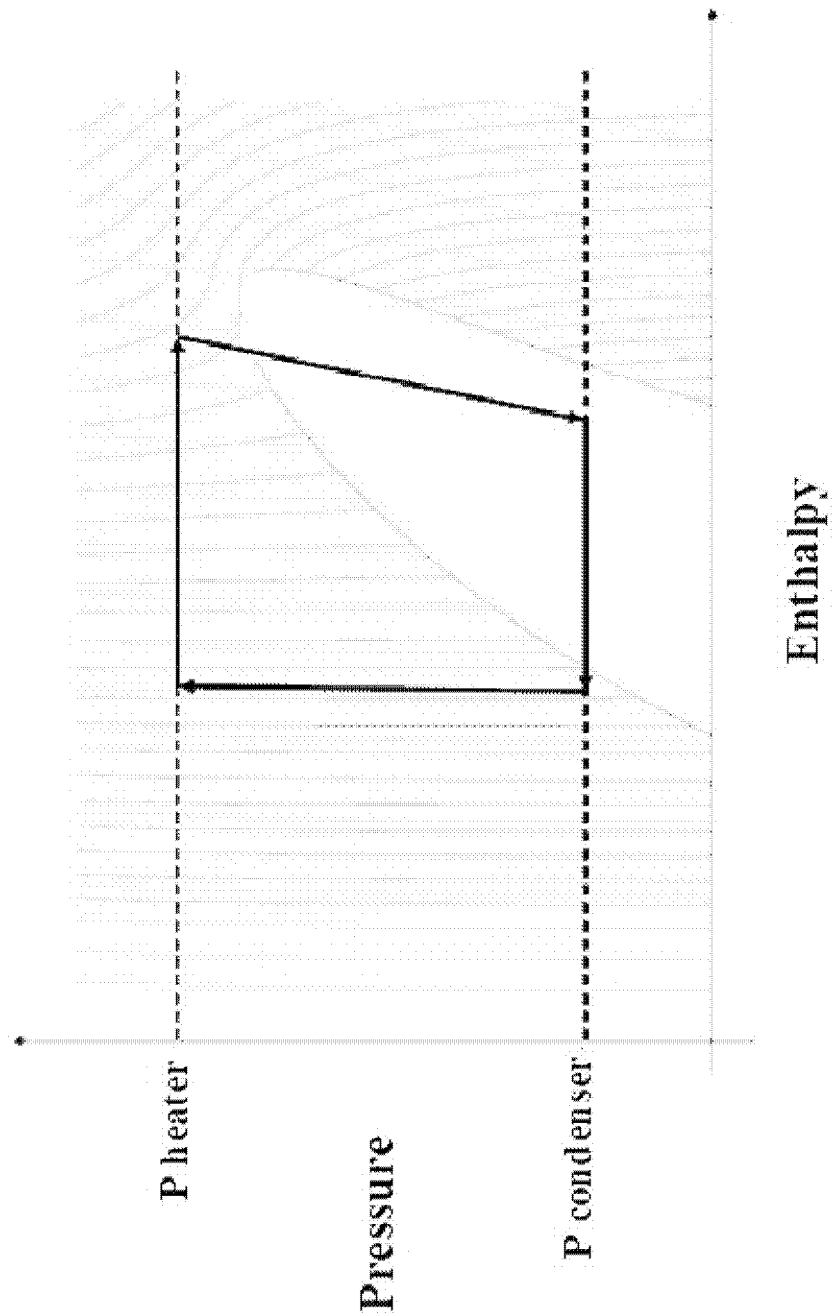
FIG. 7 shows a transcritical ORC with wet expansion and with the temperature at the expander inlet higher than the critical temperature of the working fluid.

Exemplar 3—Transcritical ORC; Wet Expansion; $T_{expander\ inlet} > T_{critical}$ FIG. 7 shows one embodiment of the present invention, wherein a transcritical ORC is used. FIG. 7 is a pressure-enthalpy diagram for the cycle of this embodiment. The substantially vertical lines on the plot are isentropic lines. The lines that are vertical on the left half of the curve but start showing deviation and curvature on the right half of the plot are isothermal lines. The broken line on the left side of the dome shape is the saturated liquid line. The broken line on the right side of the dome shape is the saturated vapor line.

In the first step, the working fluid is compressed (pressurized) above the critical pressure of the working fluid, usually substantially isentropically. It is then heated under a substantially constant pressure condition to a temperature only slightly above its critical temperature.

The working fluid temperature is above its critical temperature only to such an extent that in the next step, when the working fluid is expanded, usually substantially isentropically, its temperature is reduced, and the isentropic expansion is a wet expansion. Specifically, the working fluid at the end of the expansion step is a vapor-liquid mixture.

In the next step, the working fluid is cooled, the vapor portion of the working fluid is condensed and heat is rejected and its temperature is reduced. The working fluid in a vapor-liquid mixture passes through a phase change boundary at the saturated liquid curve. The working fluid is in a slightly subcooled liquid state at the end of this step.

Figure 8:
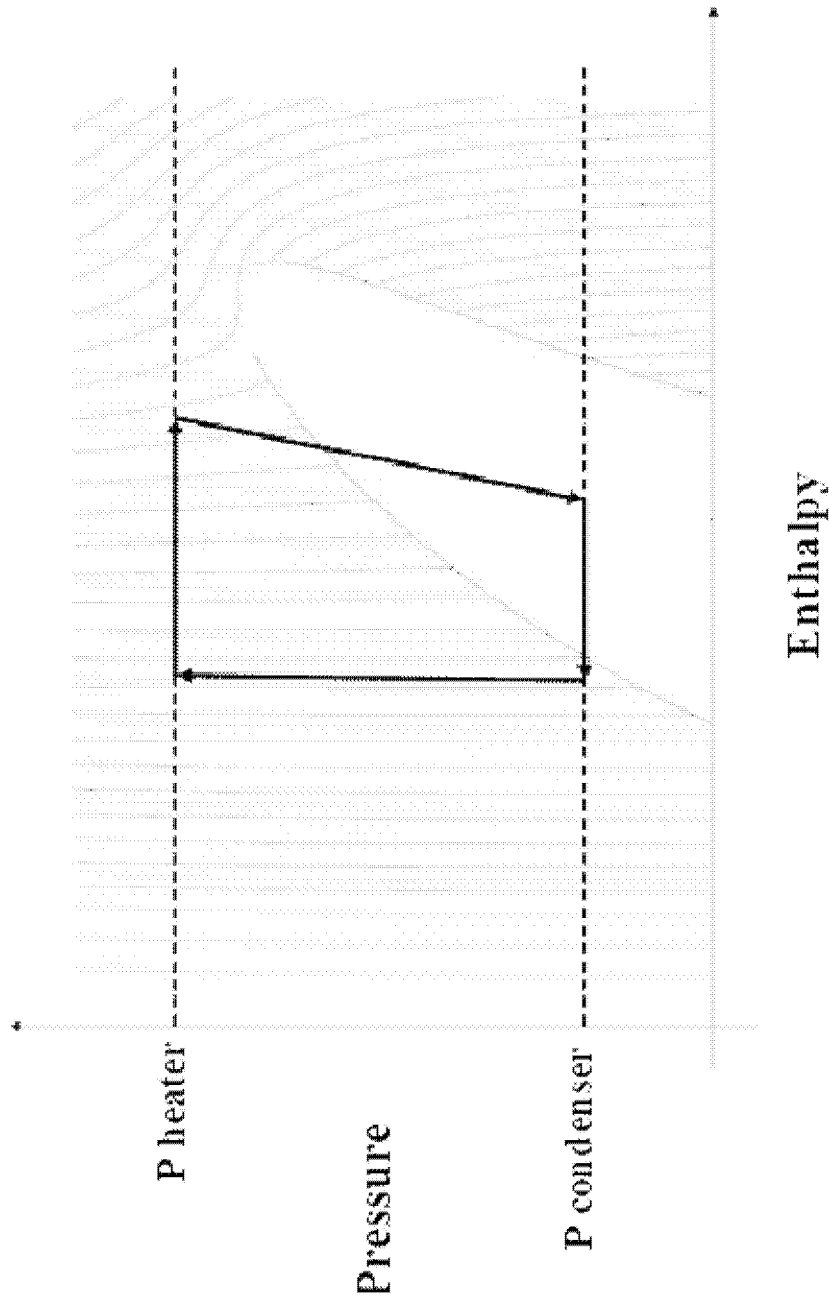
FIG. 8 shows a transcritical ORC with wet expansion, but with the temperature at the expander inlet lower than the critical temperature of the working fluid.

Exemplar 4—Transcritical ORC; Wet Expansion; $T_{expander\ inlet} < T_{critical}$ FIG. 8 shows one embodiment of the present invention, wherein a transcritical ORC is used. FIG. 8 is a pressure-enthalpy diagram for the cycle of this embodiment. The substantially vertical lines on the plot are isentropic lines. The lines that are vertical on the left half of the curve but start showing deviation and curvature on the right half of the plot are isothermal lines. The broken line on the left side of the dome shape is the saturated liquid line. The broken line on the right side of the dome shape is the saturated vapor line.

In the first step, the working fluid is compressed (pressurized) above the critical pressure of the working fluid, usually substantially isentropically. It is then heated under a substantially constant pressure condition to a temperature below its critical temperature.

In the next step, the working fluid is expanded, usually substantially isentropically, to a state of lower pressure and temperature at which it forms a vapor-liquid mixture (wet expansion).

In the next step, the working fluid is cooled, the vapor portion of the working fluid is condensed and heat is rejected. The working fluid is in a slightly subcooled liquid state at the end of this step.

While the above exemplars show substantially isentropic, isenthalpic, or isothermal expansions and pressurizations, and isobaric heating or cooling, other cycles wherein such isentropic, isenthalpic, isothermal, or isobaric conditions are not maintained but the cycle is nevertheless accomplished, are within the scope of the present invention.

One embodiment of the present invention relates to the Variable Phase Cycle or Trilateral Cycle (Phil Welch and Patrick Boyle: "New Turbines to Enable Efficient Geothermal Power Plants" GRC *Transactions*, Vol. 33, 2009). Liquid working fluid is pressurized and then heated in a heat exchanger with no vaporization. The heated, pressurized liquid leaving the heat exchanger is directly expanded in a two-phase expander. The low pressure fluid is condensed, closing the cycle.

In one embodiment, the present invention relates to a working fluid composition used in ORC systems to recover heat from heat sources, wherein the working fluid composition is maintained at a temperature in the range of from about 175° C. to about 300° C., preferably from about 200° C. to 250° C. and wherein the composition comprises at least about 20 weight percent cis-1,1,1,4,4,4-hexafluoro-2-butene (HFO-1336mzz-Z), or at least about 20 weight percent trans-1,1,1,4,4,4-hexafluoro-2-butene (HFO-1336mzz-E), or at least about 20 weight percent of a mixture thereof.

ORC Systems

In yet another embodiment, the present invention relates to ORC systems using the novel working fluid comprising at least about 20 weight percent cis-1,1,1,4,4,4-hexafluoro-2-butene (HFO-1336mzz-Z), or at least about 20 weight percent trans-1,1,1,4,4,4-hexafluoro-2-butene (HFO-1336mzz-E), or at least about 20 weight percent of a mixture thereof. In another embodiment of the system, the working fluid comprises at least 30 weight percent HFO-1336mzz-Z, HFO-1336mzz-E, or mixtures thereof. In another embodiment of the system, the working fluid comprises at least 40 weight percent HFO-1336mzz-Z, HFO-1336mzz-E, or mixtures thereof. In another embodiment of the system, the working fluid comprises at least 50 weight percent HFO-1336mzz-Z, HFO-1336mzz-E, or mixtures thereof.

In one embodiment of the above system, wherein the working fluid comprises a mixture of HFO-1336mzz-Z and HFO-1336mzz-E, the working fluid comprises at least about 10 weight percent HFO-1336mzz-E and 90 or more weight percent HFO-1336mzz-Z. In another embodiment, wherein the working fluid comprises a mixture of HFO-1336mzz-Z and HFO-1336mzz-E, the working fluid comprises at least about 15 weight percent HFO-1336mzz-E and 85 or more weight percent HFO-1336mzz-Z. In another embodiment, wherein the working fluid comprises a mixture of HFO-1336mzz-Z and HFO-1336mzz-E, the working fluid comprises at least about 20 weight percent HFO-1336mzz-E and 80 or more weight percent HFO-1336mzz-Z. In another embodiment, wherein the working fluid comprises a mixture of HFO-1336mzz-Z and HFO-1336mzz-E, the working fluid comprises at least about 25 weight percent HFO-1336mzz-E and 75 or more weight percent HFO-1336mzz-Z. In another embodiment, wherein the working fluid comprises a mixture of HFO-1336mzz-Z and HFO-1336mzz-E, the working fluid comprises from about 25 weight percent to about 75 weight percent HFO-1336mzz-E and from about 75 weight percent to about 25 weight percent HFO-1336mzz-Z.

In one embodiment, the working fluid in the ORC system may consist of HFO-1336mzz-Z. In another embodiment, the working fluid in the ORC system may consist of HFO-1336mzz-E. In another embodiment, the working fluid in the ORC system may consist of a mixture of HFO-1336mzz-Z and HFO-1336mzz-E.

In another embodiment, the present invention includes an Organic Rankine Cycle System extracting heat at an operating pressure in the range of about 3 MPa to about 10 MPa, wherein said system contains a working fluid, and wherein about 50 weight percent of said working fluid comprises HFO-1336mzz-Z, HFO-1336mzz-E, or mixtures thereof.

The novel working fluid of the present invention may be used in an ORC system to extract thermal energy and convert it to mechanical energy from heat sources such as low pressure steam, low grade thermal energy sources such as industrial waste heat, solar energy, geothermal hot water, low-pressure geothermal steam (primary or secondary arrangements) or distributed power generation equipment utilizing fuel cells or prime movers such as turbines, micro-turbines, or internal combustion engines. Low-pressure steam can also be accessed in a process known as a binary Rankine cycle. Large quantities of low-pressure steam can be found in numerous locations, such as in fossil fuel powered electrical generating power plants. The working fluid of the present invention can be tailored to suit the power plant coolant quality (its temperature), maximizing the efficiency of the binary cycle.

Other sources of heat include waste heat recovered from gases exhausted from mobile internal combustion engines (e.g. truck or rail or ship Diesel engines), aircraft engines, waste heat from exhaust gases from stationary internal combustion engines (e.g. stationary Diesel engine power generators), waste heat from fuel cells, heat available at Combined Heating, Cooling and Power or District Heating and Cooling plants, waste heat from biomass fueled engines, heat from natural gas or methane gas burners or methane-fired boilers or methane fuel cells (e.g. at distributed power generation facilities) operated with methane from various sources including biogas, landfill gas and coal bed methane, heat from combustion of bark and lignin at paper/pulp mills, heat from incinerators, heat from low pressure steam at conventional steam power plants to drive "bottoming" Rankine cycles with a composition that is at least about 20 weight percent cis-1,1,1,4,4,4-hexafluoro-2-butene (HFO-1336mzz-Z), or at least about 20 weight percent trans-1,1,1,4,4,4-hexafluoro-2-butene (HFO-1336mzz-E), or at least about 20 weight percent of a mixture thereof as the working fluid, geothermal heat to Rankine cycles with a composition that is at least about 20 weight percent cis-1,1,1,4,4,4-hexafluoro-2-butene (HFO-1336mzz-Z), or at least about 20 weight percent trans-1,1,1,4,4,4-hexafluoro-2-butene (HFO-1336mzz-E), or at least about 20 weight percent of a mixture thereof as the working fluid circulating above ground (e.g. binary cycle geothermal power plants), geothermal heat to Rankine cycles with HFO-1336mzz-Z or HFO-1336mzz-E or mixtures of HFO-1336mzz-Z and HFO-1336mzz-E as the Rankine cycle working fluid and as a geothermal heat carrier circulating underground in deep wells with the flow largely or exclusively driven by temperature-induced fluid density variations, known as "the thermosiphon effect" (e.g. see Davis, A. P. and E. E. Michaelides: "Geothermal power production from abandoned oil wells", Energy, 34 (2009) 866-872; Matthews, H. B. U.S. Pat. No. 4,142,108—Feb. 27, 1979) solar heat from solar panel arrays including parabolic solar panel arrays, solar heat from Concentrated Solar Power plants, heat removed from photovoltaic (PV) solar systems to cool the PV system to maintain a high PV system efficiency. In other embodiments, the present invention also uses other types of ORC systems, for example, small scale (e.g. 1-500 kw, preferably 5-250 kw) Rankine cycle systems using micro-turbines or small size positive displacement expanders (e.g. Tahir, Yamada and Hoshino: "Efficiency of compact organic Rankine cycle system with rotary-vane-type expander for low-temperature waste heat recovery", Int'l. J. of Civil and Environ. Eng 2:1 2010), combined, multistage, and cascade Rankine Cycles, and Rankine Cycle systems with recuperators to recover heat from the vapor exiting the expander.

Other sources of heat include at least one operation associated with at least one industry selected from the group consisting of: oil refineries, petrochemical plants, oil and gas pipelines, chemical industry, commercial buildings, hotels, shopping malls, supermarkets, bakeries, food processing industries, restaurants, paint curing ovens, furniture making, plastics molders, cement kilns, lumber kilns, calcining operations, steel industry, glass industry, foundries, smelting, air-conditioning, refrigeration, and central heating.

Methods for Replacing HFC-245fa in ORC Systems

Currently used ORC systems utilizing HFC-245fa may be in need of a new working fluid with lower global warming potential (GWP). The GWP of HFC-245fa is 1030. The GWP for working fluids of the present invention are considerably lower. HFO-1336mzz-Z has a GWP of 9.4, while HFO-1336mzz-E has a GWP of about 32. Thus, many working fluids may be formulated that provide more environmentally sustainable working fluids for ORC systems using HFO-1336mzz-Z, HFO-1336mzz-E or mixtures thereof.

In one embodiment is provided a method for replacing HFC-245fa in a power cycle system comprising removing said HFC-245fa from said power cycle system and charging said system with a replacement working fluid comprising at least about 20 weight percent of HFO-1336mzz-Z, HFO-1336mzz-E, or mixtures thereof. In another embodiment, the replacement working fluid comprises at least 30 weight percent HFO-1336mzz-Z, HFO-1336mzz-E, or mixtures thereof. In another embodiment, the replacement working fluid comprises at least 40 weight percent HFO-1336mzz-Z, HFO-1336mzz-E, or mixtures thereof. In another embodiment, the replacement working fluid comprises at least 50 weight percent HFO-1336mzz-Z, HFO-1336mzz-E, or mixtures thereof.

In one embodiment of the above process, wherein the working fluid comprises a mixture of HFO-1336mzz-Z and HFO-1336mzz-E, the working fluid comprises at least about 10 weight percent HFO-1336mzz-E and 90 or more weight percent HFO-1336mzz-Z. In another embodiment, wherein the working fluid comprises a mixture of HFO-1336mzz-Z and HFO-1336mzz-E, the working fluid comprises at least about 15 weight percent HFO-1336mzz-E and 85 or more weight percent HFO-1336mzz-Z. In another embodiment, wherein the working fluid comprises a mixture of HFO-1336mzz-Z and HFO-1336mzz-E, the working fluid comprises at least about 20 weight percent HFO-1336mzz-E and 80 or more weight percent HFO-1336mzz-Z. In another embodiment, wherein the working fluid comprises a mixture of HFO-1336mzz-Z and HFO-1336mzz-E, the working fluid comprises at least about 25 weight percent HFO-1336mzz-E and 75 or more weight percent HFO-1336mzz-Z. In another embodiment, wherein the working fluid comprises a mixture of HFO-1336mzz-Z and HFO-1336mzz-E, the working fluid comprises from about 25 weight percent to about 75 weight percent HFO-1336mzz-E and from about 75 weight percent to about 25 weight percent HFO-1336mzz-Z.

The working fluid described above comprises at least about 20 weight percent cis-1,1,1,4,4,4-hexafluoro-2-butene (HFO-1336mzz-Z), or at least about 20 weight percent trans-1,1,1,4,4,4-hexafluoro-2-butene (HFO-1336mzz-E), or at least about 20 weight percent of a mixture thereof. In another embodiment, the working fluid comprises at least 30 weight percent HFO-1336mzz-Z, HFO-1336mzz-E, or mixtures thereof. In another embodiment, the working fluid comprises at least 40 weight percent HFO-1336mzz-Z, HFO-1336mzz-E, or mixtures thereof. In another embodiment, the working fluid comprises at least 50 weight percent HFO-1336mzz-Z, HFO-1336mzz-E, or mixtures thereof. In a suitable embodiment, said at least about 20 weight percent cis-1,1,1,4,4,4-hexafluoro-2-butene (HFO-1336mzz-Z), or said at least about 20 weight percent trans-1,1,1,4,4,4-hexafluoro-2-butene (HFO-1336mzz-E), or said at least about 20 weight percent of a mixture thereof is selected from the following percentage content of the working fluid:

about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 50.5, 51, 52, 52.5, 53, 53.5, 54, 54.5, 55, 55.5, 56, 56.5, 57, 57.5, 58, 58.5, 59, 59.5, 60, 60.5, 61, 61.5, 62, 62.5, 63, 63.5, 64, 64.5, 65, 65.5, 66, 66.5, 67, 67.5, 68, 68.5, 69, 69.5, 70, 70.5, 71, 71.5, 72, 72.5, 73, 73.5, 74, 74.5, 75, 55.5, 76, 76.5, 77, 77.5, 78, 78.5, 79, 79.5, 80, 80.5, 81, 81.5, 82, 82.5, 83, 83.5, 84, 84.5, 85, 85.5, 86, 86.5, 87, 87.5, 88, 88.5, 89, 89.5, 90, 90.5, 91, 91.5, 92, 92.5, 93, 93.5, 94, 94.5, 95, 95.5, 96, 96.5, 97, 97.5, 98, 98.5, 99, 99.5, and about 100%.

In another suitable embodiment, said at least about 20 weight percent cis-1,1,1,4,4,4-hexafluoro-2-butene (HFO-1336mzz-Z), or said at least about 20 weight percent trans-1,1,1,4,4,4-hexafluoro-2-butene (HFO-1336mzz-E), or said at least about 20 weight percent of a mixture thereof is selected from a range defined by any two percentage numbers above (inclusive of endpoints).

In one embodiment of the above process, wherein the working fluid comprises a mixture of HFO-1336mzz-Z and HFO-1336mzz-E, the working fluid comprises at least about 10 weight percent HFO-1336mzz-E and 90 or more weight percent HFO-1336mzz-Z. In another embodiment, wherein the working fluid comprises a mixture of HFO-1336mzz-Z and HFO-1336mzz-E, the working fluid comprises at least about 15 weight percent HFO-1336mzz-E and 85 or more weight percent HFO-1336mzz-Z. In another embodiment, wherein the working fluid comprises a mixture of HFO-1336mzz-Z and HFO-1336mzz-E, the working fluid comprises at least about 20 weight percent HFO-1336mzz-E and 80 or more weight percent HFO-1336mzz-Z. In another embodiment, wherein the working fluid comprises a mixture of HFO-1336mzz-Z and HFO-1336mzz-E, the working fluid comprises at least about 25 weight percent HFO-1336mzz-E and 75 or more weight percent HFO-1336mzz-Z. In another embodiment, wherein the working fluid comprises a mixture of HFO-1336mzz-Z and HFO-1336mzz-E, the working fluid comprises from about 25 weight percent to about 75 weight percent HFO-1336mzz-E and from about 75 weight percent to about 25 weight percent HFO-1336mzz-Z.

The working fluid can also comprise less than about 80 weight percent of one or more of other components selected from the following:

cis-HFO-1234ze; trans-HFO-1234ze; HFO-1234yf; HFO-1234ye-E or Z; HFO 1225ye(Z); HFO-1225ye (E); HFO-1225yc; HFO-1243zf (3,3,3-trifluoropropene); HFO-1233zd-E or Z; HFO-1233xf; $CF_3CH=CHCF_3$ (E); $(CF_3)_2CFCH=CHF$ (E & Z); $(CF_3)_2CFCH=CF_2$; $CF_3CHFC=CHF$ (E & Z); $(C_2F_5)(CF_3)C=CH_2$; HFC-245fa; HFC-245eb; HFC-245ca; HFC-245cb; HFC-227ea; HFC-236cb; HFC-236ea; HFC-236fa; HFC-365mfc; HFC-43-10mee; $CHF_2$—O—$CHF_2$; $CHF_2$—O—$CH_2F$; $CH_2F$—O—$CH_2F$; $CH_2F$—O—$CH_3$; cyclo-$CF_2$—$CH_2$—$CF_2$—O; cyclo-$CF_2$—$CF_2$—CH—O; $CHF_2$—O—$CF_2$—$CHF_2$; $CF_3$—$CF_2$—O—$CH_2F$; $CHF_2$—O—CHF—$CF_3$; $CHF_2$—O—$CF_2$—$CHF_2$; $CH_2F$—O—$CF_2$—$CHF_2$; $CF_3$—O—$CF_2$—$CH_3$; $CHF_2$—CHF—O—$CHF_2$; $CF_3$—O—CHF—$CH_2F$; $CF_3$—CHF—O—$CH_2F$; $CF_3$—O—$CH_2$—$CHF_2$; $CHF_2$—O—$CH_2$—$CF_3$; $CH_2F$—$CF_2$—O—$CH_2F$; $CHF_2$—$OF_2$—$CH_3$; $CHF_2$—$CF_2$—O—$CH_3$; $CH_2F$—O—CHF—$CH_2F$; $CHF_2$—CHF—O—$CH_2F$; $CF_3$—O—CHF—$CH_3$; $CF_3$—CHF—O—$CH_3$; $CHF_2$—O—$CH_2$—$CHF_2$; $CF_3$—O—$CH_2$—$CH_2F$; $CF_3$—$CH_2$—O—$CH_2F$; $CF_2H$—$CF_2$—$CF_2$—O—$CH_3$; propane; cyclopropane; butane; isobutane; n-pentane; isopentane; neopentane; cyclopentane; n-hexane; isohexane; heptane; trans-1,2-dichloroethylene, and mixtures with cis-HFO-1234ze and HFC-245fa.

In one embodiment, the working fluid comprises 80 weight percent or less of at least one of the above compounds. In another embodiment, the working fluid comprises 70 weight percent or less of at least one of the above compounds. In another embodiment, the working fluid comprises 60 weight percent or less of at least one of the above compounds. In another embodiment, the working fluid comprises 50 weight percent or less of at least one of the above compounds.

In one embodiment, the working fluid for extracting heat may consist of HFO-1336mzz-Z. In another embodiment, the working fluid for extracting heat may consist of HFO-1336mzz-E. In another embodiment, the working fluid for extracting heat may consist of a mixture of HFO-1336mzz-Z and HFO-1336mzz-E.

EXAMPLES

The concepts described herein will be further described in the following examples, which do not limit the scope of the invention described in the claims.

Example A

Example A demonstrates the generation of power from diesel engine exhaust heat using Rankine Cycles with HFO-1336mzz-Z under subcritical conditions wherein the evaporation temperature $T_{evap}$ is less than the critical temperature of HFO-1336mzz-Z ($T_{cr\_HFO-1336mzz-Z}$=171.28° C.).

Mechanical power generation from heat extracted from the exhaust gases of internal combustion engines (e.g. Diesel engines) using Rankine cycle systems with HFO-1336mzz-Z as the working fluid is illustrated in the examples below. The mechanical power generated through the Rankine cycle is in addition to the mechanical power generated by the engine from fuel combustion and increases the overall amount of mechanical power generated per unit of fuel mass combusted.

The performance of the working fluid comprising HFO-1336mzz-Z ($CF_3CH=CHCF_3$) is compared with the performance of the well-known working fluid HFC-245fa ($CHF_2CH_2CF_3$).

Example A1: Low Temperature Operation ($T_{evaporator}$=132.22° C.)

| Evaporator (boiler) temperature: | $T_{evaporator}$ | =270° F. | =132.22° C. |
|---|---|---|---|
| Condenser temperature: | $T_{condenser}$ | =130° F. | =54.44° C. |
| Superheat of vapor entering the expander: | $\Delta T_{suph}$ | =36° F. | =20° C. |
| Liquid Sub-cooling: | $\Delta T_{subc}$ | =14° F. | =7.78° C. |
| Expander Efficiency | $\eta_{exp}$ | | =0.85 |
| Pump Efficiency | $\eta_{pump}$ | | =0.85 |

TABLE A1

| | | HFC-245fa | HFO-1336mzz-Z | HFO-1336mzz-Z vs HFC-245fa % |
|---|---|---|---|---|
| GWP_100 | | 1030 | 9.4 | |
| $T_{evap}$ | ° C. | 132.22 | 132.22 | |
| $T_{cond}$ | ° C. | 54.44 | 54.44 | |
| $\Delta T_{suph}$ | ° C. | 20 | 20 | |
| $\Delta T_{subc}$ | ° C. | 7.78 | 7.78 | |
| EFF_expn | | 0.85 | 0.85 | |
| EFF_comp | | 0.85 | 0.85 | |
| $P_{evap}$ | MPa | 2.45 | 1.41 | −42.21 |
| $P_{cond}$ | MPa | 0.39 | 0.21 | −47.50 |
| EFF | | 0.1142 | 0.1141 | −0.09 |
| CAP | kJ/m3 | 543.63 | 311.86 | −42.63 |

Table A1 shows that HFO-1336mzz-Z virtually matches the energy efficiency of HFC-245fa while offering a much lower GWP. Moreover, HFO-1336mzz-Z generates substantially lower operating pressures than HFC-245fa. (However, the volumetric capacity of HFO-1336mzz-Z to generate power, CAP, is lower than HFC-245fa.

The thermodynamic efficiency of the Rankine cycle operating with HFO-1336mzz-Z, 11.41%, virtually matches that of HFC-245fa at the same cycle operating conditions. The evaporator pressure with HFO-1336mzz-Z (1.41 MPa) is substantially lower than with HFC-245fa (2.45 MPa). (A higher volumetric flow rate at the expander exit is required to generate a target mechanical power rate with HFO-1336mzz-Z than with HFC-245fa. Equivalently, a lower amount of mechanical work is generated when a unit of HFO-1336mzz-Z volume is circulated through the cycle (311.86 kJ/m3) than HFC-245fa (543.63 kJ/m³).

Example A2: High Temperature Operation ($T_{evaporator}$=155° C.)

HFO-1336mzz-Z has a higher critical temperature (see Table A2) and generates lower vapor pressures than HFC-245fa. As a result, HFO-1336mzz-Z can enable sub-critical Organic Rankine cycle operation at higher temperatures than HFC-245fa (see Table A3).

TABLE A2

Critical point of HFO-1336mzz-Z compared to HFC-245fa

| | | HFO-1336mzz-Z | HFC-245fa |
|---|---|---|---|
| $T_{cr}$ | ° C. | 171.28 | 154 |
| $P_{cr}$ | MPa | 2.903 | 3.650 |

TABLE A3

Rankine Cycle with HFO-1336mzz-Z at Tevap = 155° C. vs 132.22° C.

| | | HFO-1336mzz-Z at $T_{evap}$ = 132.22° C. | HFO-1336mzz-Z at $T_{evap}$ = 155° C. | $T_{evap}$ = 155° C. versus $T_{evap}$ = 132.22° C.; % |
|---|---|---|---|---|
| $T_{evap}$ | ° C. | 132.22 | 155 | |
| $T_{cond}$ | ° C. | 54.44 | 54.44 | |
| $\Delta T_{suph}$ | ° C. | 20 | 20 | |
| $\Delta T_{subc}$ | ° C. | 7.78 | 7.78 | |
| EFF_expn | | 0.85 | 0.85 | |
| EFF_comp | | 0.85 | 0.85 | |
| $P_{evap}$ | MPa | 1.41 | 2.18 | 54.11 |
| $P_{cond}$ | MPa | 0.21 | 0.21 | 0.00 |
| EFF_thermal | | 0.1141 | 0.1311 | 14.90 |
| CAP_e | kJ/m³ | 311.86 | 369.64 | 18.53 |

HFO-1336mzz-Z can be used as a working fluid for a subcritical Organic Rankine cycle operating with a heat source that allows the evaporator to reach a temperature of 155° C. (i.e. higher than the critical temperature of HFC-245fa). Table A3 shows that an evaporator temperature of 155° C. leads to substantially improved efficiency and volumetric capacity for power generation (by 14.90% and 18.53%, respectively) relative to an evaporating temperature of 132.22° C.

Example A3: High Temperature Operation ($T_{evaporator}$=161.60° C.)

HFO-1336mzz-Z generates lower vapor pressures than HFC-245fa at a given temperature. Therefore, for any given maximum permissible evaporator working pressure, HFO-1336mzz-Z can enable Organic Rankine Cycles operating at higher evaporator temperatures than HFC-245fa. Table A4 compares an Organic Rankine Cycle with HFO-1336mzz-Z and an evaporator temperature of 161.6° C. to an Organic Rankine Cycle with HFC-245fa and an evaporator temperature of 132.22° C. Both cycles operate with an evaporator operating pressure of 2.45 MPa. The cycle operating with HFO-1336mzz-Z achieves higher energy efficiency (13.51%) than HFC-245fa (11.42%).

TABLE A4

Rankine Cycle with HFO-1336mzz-Z vs HFC-245fa at $P_{evap}$ = 2.45 MPa

|  |  | HFC-245fa | HFO-1336mzz-Z | HFO-1336mzz-Z Vs HFC-245fa; in % |
|---|---|---|---|---|
| $T_{evap}$ | °C. | 132.22 | 161.6 |  |
| $T_{cond}$ | °C. | 54.44 | 54.44 |  |
| $\Delta T_{suph}$ | °C. | 20 | 20 |  |
| $\Delta T_{subc}$ | °C. | 7.78 | 7.78 |  |
| EFF_expn |  | 0.85 | 0.85 |  |
| EFF_comp |  | 0.85 | 0.85 |  |
| $P_{evap}$ | MPa | 2.45 | 2.45 |  |
| $P_{cond}$ | MPa | 0.39 | 0.21 | −47.50 |
| EFF_thermal |  | 0.1142 | 0.1351 | 18.30 |
| CAP_e | kJ/m³ | 543.63 | 383.86 | −29.39 |

Example B

Example B demonstrates the generation of power from diesel engine exhaust heat using Rankine Cycles with HFO-1336mzz-Z under transcritical conditions.

Surprisingly, HFO-1336-mzz-Z remains chemically stable at temperatures substantially higher than its critical temperature (of 171.28° C.). Therefore, HFO-1336-mzz-Z can enable Rankine cycles that harvest heat sources with temperatures higher than 171.28° C. using HFO-1336-mzz-Z as the working fluid in a supercritical state. Use of higher temperature heat sources leads to higher cycle energy efficiencies and volumetric capacities for power generation (relative to the use of lower temperature heat sources).

Figure 3:
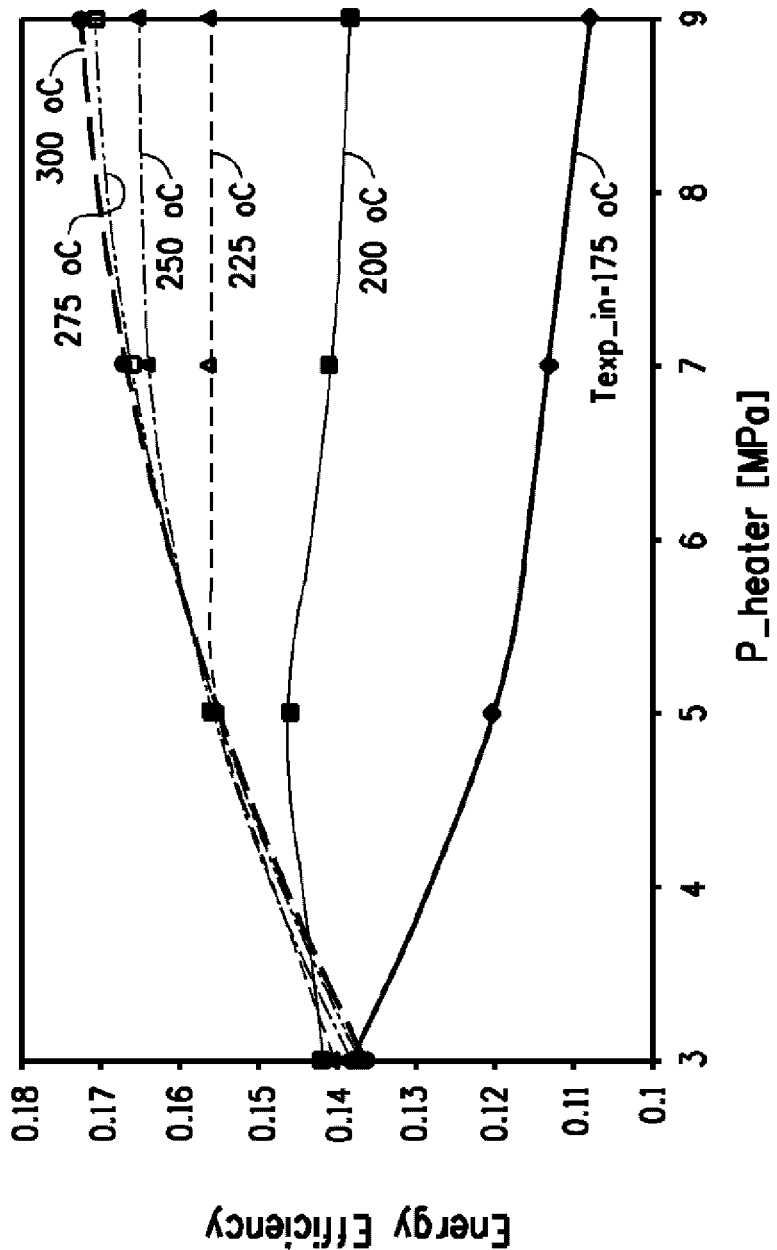
FIG. 3 shows the energy efficiency of transcritical Organic Rankine Cycles operating with HFO-1336mzz-Z as the working fluid as a function of the pressure of the fluid heater for selected temperatures of the working fluid at the expander inlet ($T_{cond}$=54.44° C.; $T_{subcooling}$=7.78° C.; Expander Efficiency=0.85; and Pump Efficiency=0.85).

When a supercritical fluid heater is used instead of the evaporator (or boiler) of the conventional subcritical Rankine cycle, the heater pressure and the heater exit temperature (or equivalently the expander inlet temperature) must be specified. FIG. 3 shows the energy efficiency of a transcritical Rankine cycle operating with HFO-1336mzz-Z as the working fluid as a function of the pressure of the supercritical fluid heater and the temperature of the working fluid at the expander inlet. For example, operating the supercritical fluid heater at a pressure of 5 MPa and a heater exit temperature (or expander inlet temperature) of 225° C. achieves a Rankine cycle energy efficiency of 15.5%. At higher expander inlet temperatures, maximum efficiency is achieved at increasingly higher heater pressures. Higher operating pressures in the supercritical fluid heater would necessitate the use of more robust equipment.

Often the temperature of the heat source diminishes during the heat exchange process. In the case of sub-critical Rankine cycle operation, the working fluid temperature is constant throughout the heat extraction evaporation process. The use of a supercritical fluid to extract heat allows better matching between the varying temperatures of the heat source and of the supercritical working fluid relative to the case of sub-critical operation. As a result, the effectiveness of the heat exchange process for the transcritical cycle can be higher than that of the sub-critical cycle (see Chen et al, Energy, 36, (2011) 549-555 and references therein).

Example B1: Transcritical Organic Rankine Cycle with $T_{expander\ in}$=200 or 250° C.

TABLE B1

Performance of transcritical Organic Rankine Cycles with HFO-1336mzz-Z as the working fluid at two selected sets of conditions A and B

|  | units | HFO-1336mzz-Z A | HFO-1336mzz-Z B | A vs B; in % |
|---|---|---|---|---|
| $P_{heater}$ | MPa | 3 | 6 |  |
| $T_{expn\_in}$ | °C. | 200 | 250 |  |
| $T_{cond}$ | °C. | 54.44 | 54.44 |  |
| $\Delta T_{subc}$ | °C. | 7.78 | 7.78 |  |
| EFF_expn |  | 0.85 | 0.85 |  |
| EFF_comp |  | 0.85 | 0.85 |  |
| $P_{cond}$ | MPa | 0.21 | 0.21 |  |
| EFF_thermal |  | 0.142 | 0.161 | 13.38 |
| CAP_e | kJ/m³ | 412.03 | 493.83 | 19.85 |

Table B1 shows that a Rankine cycle first heating HFO-1336mzz-Z at 3 MPa to 200° C. then expanding the heated HFO-1336mzz-Z to the operating pressure (0.21 MPa) of the condenser at Tcond=54.44° C. achieves a thermal efficiency of 14.2% and a volumetric capacity for power generation of 412.03 kJ/m³. Even higher efficiency and volumetric capacity for power generation can be achieved when the working fluid, HFO-1336mzz-Z, is heated to 250° C. at a pressure of 6 MPa. HFO-1336mzz-Z remains sufficiently stable at 250° C. Higher efficiencies and capacities are achieved with the transcritical cycles vs the subcritical cycles in example A. Table B2 compares the performance of a transcritical Rankine cycle with HFO-1336mzz-Z as the working fluid to HFC-245fa for the same fluid heater pressure, heater exit temperature, condenser temperature, liquid sub-cooling, expander efficiency and liquid compressor (i.e. pump) efficiency.

TABLE B2

Performance of a transcritical Rankine cycle with HFO-1336mzz-Z as the working fluid compared to HFC-245fa

|  |  | HFC-245fa | HFO-1336mzz-Z | HFO-1336mzz-Z vs HFC-245fa; in % |
|---|---|---|---|---|
| $P_{heater}$ | MPa | 6 | 6 |  |
| $T_{expn\_in}$ | °C. | 250 | 250 |  |
| $T_{cond}$ | °C. | 54.44 | 54.44 |  |
| $\Delta T_{subc}$ | °C. | 7.78 | 7.78 |  |
| EFF_expn |  | 0.85 | 0.85 |  |
| EFF_comp |  | 0.85 | 0.85 |  |
| $P_{cond}$ | MPa | 0.39 | 0.21 | −47.50 |
| EFF_thermal |  | 0.149 | 0.161 | 8.05 |
| CAP_e | kJ/m³ | 801.92 | 493.83 | −38.42 |

Example C1: Sub-Critical ORC with HFO-1336mzz-Z at an Evaporator Pressure of 2.18 MPa Table C1 shows that HFO-1336mzz-Z could enable Organic Rankine cycles assembled with widely available relatively low cost HVAC-type equipment operating at moderate evaporator pressures (not exceeding about 2.18 MPa) while also offering attractive safety, health, and environmental properties and attractive energy efficiencies. Using low cost equipment substantially expands the practical applicability of ORCs (see Joost J. Brasz, Bruce P. Biederman and Gwen Holdmann: "Power Production from a Moderate-Temperature Geothermal Resource", GRC Annual Meeting, Sep. 25-28, 2005; Reno, Nev., USA). Table C1 shows that the energy efficiency enabled by HFO-1336mzz-Z, 15.51%, is 15.06% higher than the energy efficiency, 13.48%, enabled by HFC-245fa.

TABLE C1

Safety, health, environmental and ORC performance properties of HFO-1336mzz-Z for an evaporating pressure equal to 2.18 MPa compared to HFC-245fa.

| | units | HFO-1336mzz-Z | HFC-245fa |
|---|---|---|---|
| ASHRAE Standard 34 Toxicity Class | | A (expected) | B |
| ASHRAE Standard 34 Flammability Class | | 1 (expected) | 1 |
| OEL. | ppmv | 500 (expected) | 300 |
| Atmospheric Life Time | [yrs] | 0.0658 (24 days) | 7.6 |
| ODP | | None | None |
| GWP (100 year horizon) | | 9.4 | 1030 |
| Tevap | °C. | 155 | 126.2 |
| Tcond | °C. | 40 | 40 |
| ☐Tsuph | °C. | 0 | 0 |
| ☐Tsubc | °C. | 0 | 0 |
| EFF_expn | | 0.85 | 0.85 |
| EFF_comp | | 0.85 | 0.85 |
| Pevap | MPa | 2.18 | 2.18 |
| Pcond | MPa | 0.13 | 0.25 |
| Texpn_out | °C. | 81.56 | 65.50 |
| EFF_thermal | | 0.1551 | 0.1348 |

Example C2: Transcritical ORC Operating with HFO-1336mzz-Z as the Working Fluid

The Rankine cycle energy efficiency with an expander inlet temperature of 250° C. increases monotonically with heater pressure increasing from above critical pressure to 9 MPa for both HFO-1336mzz-Z and HFC-245fa. The selected heater pressure (9 MPa) in Table C2 is higher than the maximum working pressure of most commonly available HVAC type equipment.

Table C2 shows that HFO-1336mzz-Z could enable transcritical Rankine cycle systems to convert heat available at relatively high temperatures (250° C.) to power with energy efficiency 2.7% higher than HFC-245fa (at the same operating conditions) while offering more attractive safety and environmental properties.

Tables C1 and C2 show that transcritical Rankine cycle systems with HFO-1336mzz-Z, used to convert heat available at relatively high temperatures (250° C.) to power, can achieve higher energy efficiency than subcritical ORCs operating with HFO-1336mzz-Z.

TABLE C2

Performance of a transcritical ORC operating with HFO-1336mzz-Z at a supercritical fluid heater pressure of 9 MPa and an expander inlet temperature of 250° C. compared to HFC-245fa.

| | units | HFO-1336mzz-Z | HFC-245fa |
|---|---|---|---|
| P_heater | MPa | 9 | 9 |
| Texpn_in | °C. | 250 | 250 |
| Tcond | °C. | 40 | 40 |
| ΔTsubc | °C. | 0 | 0 |
| EFF_expn | | 0.85 | 0.85 |
| EFF_comp | | 0.85 | 0.85 |

TABLE C2-continued

Performance of a transcritical ORC operating with HFO-1336mzz-Z at a supercritical fluid heater pressure of 9 MPa and an expander inlet temperature of 250° C. compared to HFC-245fa.

| | units | HFO-1336mzz-Z | HFC-245fa |
|---|---|---|---|
| Pcond | MPa | 0.128 | 0.250 |
| EFF_thermal | | 0.187 | 0.182 |

Figure 4:
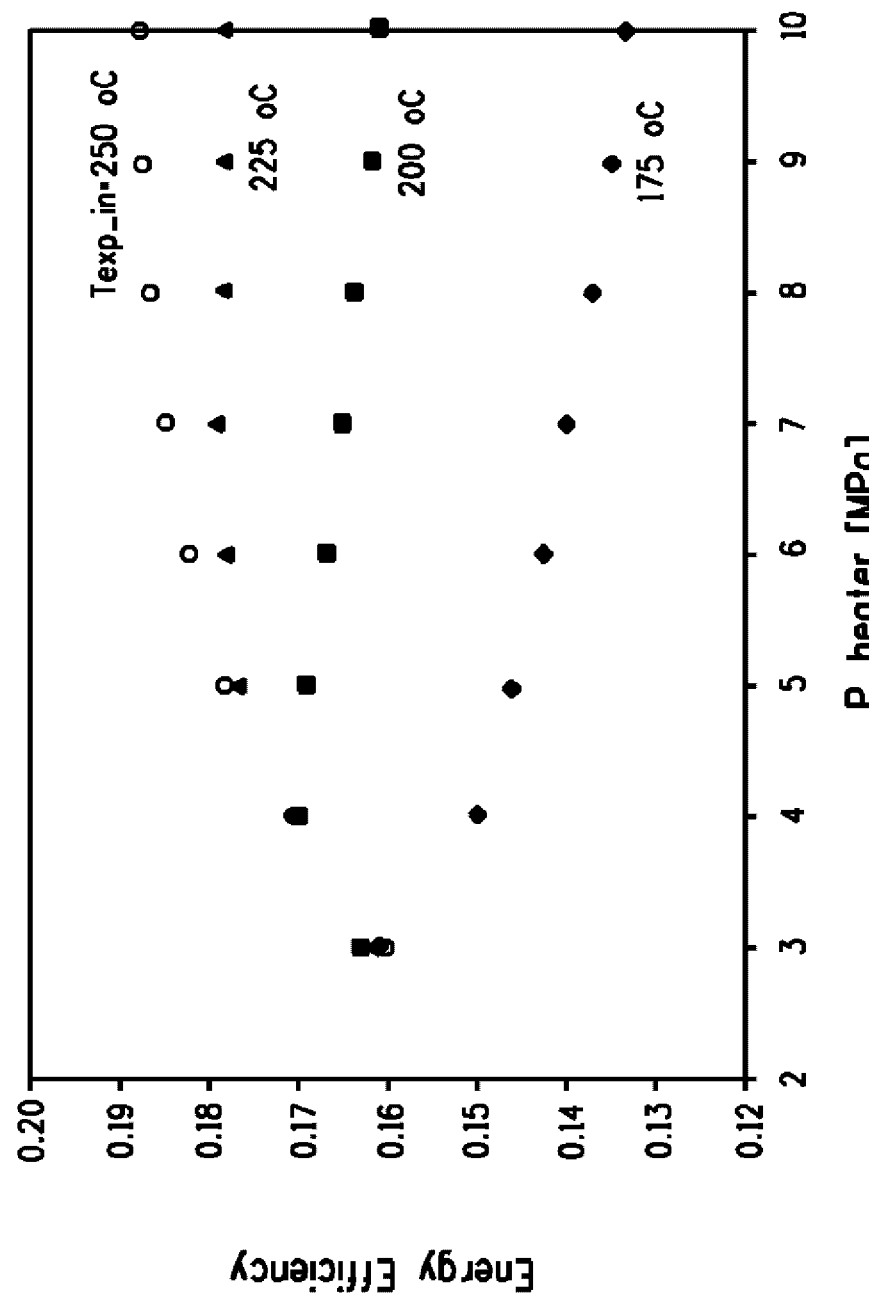
FIG. 4 shows the energy efficiency of transcritical Organic Rankine Cycles operating with HFO-1336mzz-Z as the working fluid as a function of the pressure of the fluid heater for selected temperatures of the working fluid at the expander inlet ($T_{cond}$=40° C.; $T_{subcooling}$=0° C.; Expander Efficiency=0.85; and Pump Efficiency=0.85).

Example C3: Supercritical Fluid Heater Pressures that Maximize Energy Efficiency of Rankine Cycle Operating with HFO-1336mz-Z for Selected Expander Inlet Temperatures FIG. 4 shows energy efficiency as function of heater pressure at different expander inlet temperatures. It was surprisingly found that the energy efficiency increased with heater pressure at higher expander inlet temperatures. The efficiency at 10 MPa for an expander temperature of 250° C. was found to be greater than 18%.

Example C4: Chemical Stability of HFO-1336mzz-Z

The chemical stability of HFO-1336mzz-Z in the presence of metals was scrutinized according to the sealed tube testing methodology of ANSI/ASHRAE Standard 97-2007. The stock of HFO-1336mzz-Z used in the sealed tube tests was 99.9864+weight percent pure (136 ppmw of impurities) and contained virtually no water or air.

Sealed glass tubes, each containing three metal coupons made of steel, copper, and aluminum immersed in HFO-1336mzz-Z, were aged in a heated oven at various temperatures up to 250° C. for 14 days. Visual inspection of the tubes after thermal aging indicated clear liquids with no discoloration or other visible deterioration of the fluid. Moreover, there was no change in the appearance of the metal coupons indicating corrosion or other degradation.

Table C3 shows the measured concentrations of fluoride ion in the aged liquid samples. The fluoride ion concentration can be interpreted as an indicator of the degree of HFO-1336mzz-Z degradation. Table C3 indicates that HFO-1336mzz-Z degradation was surprisingly minimal even at the highest temperature tested (250° C.).

TABLE C3

Fluoride on concentration in HFO-1336mzz-Z samples after aging at various temperatures for two weeks.

| Aging Temperature [° C.] | F-ion [ppmm] |
|---|---|
| 175 | <0.15(*) |
| 200 | 0.18 |
| 225 | 0.23 |
| 250 | 1.50 |

(*)no detectable fluoride (within the method detection limit of 0.15 ppm)

Table C4 shows compositional changes, quantified by GCMS, of HFO-1336mzz-Z samples after aging in the presence of steel, copper and aluminum at various temperatures for two weeks. Only negligible proportions of new unknown compounds appeared as a result of aging even at the highest temperature tested (250° C.).

The trans isomer of HFO-1336mzz, HFO-1336mzz-E, is expected to be thermodynamically more stable than the cis isomer, HFO-1336mzz-Z, by about 5 kcal/mole. Surprisingly, despite the substantial thermodynamic driving force for isomerization of HFO-1336mzz-Z to the more stable trans isomer, the measured results in Table C4 indicate that HFO-1336mzz-Z remained largely in the Z (or cis) isomeric form even at the highest temperature tested (250° C.). The effect of the small proportion (3,022.7 ppm or 0.30227 weight percent) of HFO-1336mzz-E that formed after two weeks of aging at 250° C. on the thermodynamic properties of the working fluid (HFO-1336mzz-Z) and, therefore on the cycle performance, would be negligible.

TABLE C4

Compositional changes of HFO-1336mzz-Z samples (quantified by GCMS) after aging in the presence of steel, copper and aluminum coupons at various temperatures for two weeks.

| Aging Temperature [° C.] | HFO-1336mzz-E [ppm] (by GC peak area) | Unknown compounds (formed as a result of aging) [ppm] (by GC peak area) |
|---|---|---|
| Initial stock of HFO-1336mzz-Z (unaged) | Not present | Not present |
| 150 | 23.8 | 0.5 |
| 175 | 38.7 | 4.0 |
| 200 | 116.6 | 25.0 |
| 225 | 343.4 | 77.1 |
| 250 | 3,022.7 | 425.5 |

Example D

Sub-Critical ORC with HFO-1336mzz-E at an Evaporator Pressure of 2.18 MPa

Table D compares the performance of a subcritical Rankine cycle operating with HFO-1336mzz-E as the working fluid to subcritical Rankine cycles operating with HFO-1336mzz-Z or HFC-245fa as the working fluids. The evaporator pressure for all cycles compared in Table D is 2.18 MPa. The cycle energy efficiency with HFO-1336mzz-E is 8.46% lower than that with HFC-245fa. The volumetric capacity for power generation with HFO-1336mzz-E is 8.6% higher than that with HFC-245fa.

The performance of HFC-245fa is bracketed by the performance of HFO-1336mzz-Z and HFO-1336mzz-E. This suggest that blends of HFO-1336mzz-Z and HFO-1336mzz-E could be formulated to replace HFC-245fa in existing Rankine Cycle applications.

TABLE D

Safety, health, environmental and ORC performance properties of HFO-1336mzz-E for an evaporating pressure equal to 2.18 MPa compared to HFO-1336mzz-Z and HFC-245fa.

| | units | HFO-1336mzz-Z | HFC 245fa | HFO-1336maz-E |
|---|---|---|---|---|
| ASHRAE Standard 34 Flammability Class | | 1 | 1 | 1 (expected) |
| ODP | | None | None | None |
| GWP (100 year horizon) | | 9.4 | 1030 | 32 |

TABLE D-continued

Safety, health, environmental and ORC performance properties of HFO-1336mzz-E for an evaporating pressure equal to 2.18 MPa compared to HFO-1336mzz-Z and HFC-245fa.

| | units | HFO-1336mzz-Z | HFC 245fa | HFO-1336maz-E |
|---|---|---|---|---|
| Tevap | ° C. | 155 | 126.2 | 118.20 |
| Tcond | ° C. | 40 | 40 | 40 |
| ΔTsuph | ° C. | 0 | 0 | 0 |
| ΔTsubc | ° C. | 0 | 0 | 0 |
| EFF_expn | | 0.85 | 0.85 | 0.85 |
| EFF_comp | | 0.85 | 0.85 | 0.85 |
| Pevap | MPa | 2.18 | 2.18 | 2.18 |
| Pcond | MPa | 0.13 | 0.25 | 0.32 |
| Texpn_out | ° C. | 81.56 | 65.50 | 60.90 |
| EFF_thermal | | 0.1551 | 0.1348 | 0.1234 |
| CAP_e (Volumetric Capacity for power generation) | kJ/m$^3$ | 272.2 | 409.9 | 445.1 |

Example E

Sub-Critical ORC with HFO-1336mzz-E at an Evaporator Temperature of 120° C.

Table E compares the performance of a Rankine cycle with HFO-1336mzz-E at an evaporating temperature of 120° C. to HFO-1336mzz-Z and HFC-145fa. The cycle energy efficiency with HFO-1336mzz-E is 3.8% lower than that with HFC-245fa. The volumetric capacity for power generation with HFO-1336mzz-E is 16.2% higher than that with HFC-245fa.

The performance of HFC-245fa is bracketed by the performance of HFO-1336mzz-Z and HFO-1336mzz-E. This suggests that blends of HFO-1336mzz-Z and HFO-1336mzz-E could be formulated to replace HFC-245fa in existing Rankine Cycle applications.

TABLE E

Subcritical ORC performance with HFO-1336mzz-E at an evaporating temperature of 120° C.

| | units | HFO-1336mzz-Z | HFC-245fa | HFO-1336mzz-E |
|---|---|---|---|---|
| Tevap | ° C. | 120 | 120 | 120 |
| Tcond | ° C. | 35 | 35 | 35 |
| ΔTsuph | ° C. | 0 | 0 | 0 |
| ΔTsubc | ° C. | 0 | 0 | 0 |
| EFF_expn | | 0.85 | 0.85 | 0.85 |
| EFF_comp | | 0.85 | 0.85 | 0.85 |
| Pevap | MPa | 1.10 | 1.93 | 2.26 |
| Pcond | MPa | 0.11 | 0.21 | 0.27 |
| Texpn_out | ° C. | 70.94 | 61.28 | 57.55 |
| EFF_thermal | | 0.1376 | 0.1372 | 0.1320 |
| CAP_e (Volumetric Capacity for power generation) | kJ/m$^3$ | 200.46 | 361.47 | 420.07 |

Example F

Sub-Critical ORC with an HFO-1336mzz-E/HFO-1336mzz-Z Blend as the Working Fluid

Table F summarizes the performance of Rankine cycles with HFO-1336mzz-E/HFO-1336mzz-Z blends of three different compositions. The composition of HFO-1336mzz-E/HFO-1336mzz-Z blends can be varied to achieve different performance targets.

TABLE F

Performance of subcritical ORCs with
HFO-1336mzz-E/HFO-1336mzz-Z blends of different compositions

|  | units | Blend A | Blend B | Blend C |
|---|---|---|---|---|
| HFO-1336mzz-Z | wt % | 75 | 50 | 25 |
| HFO-1336mzz-E | wt % | 25 | 50 | 75 |
| Tevap_average | ° C. | 120 | 120 | 120 |
| Tcond_average | ° C. | 35 | 35 | 35 |
| ΔTsuph | ° C. | 0 | 0 | 0 |
| ΔTsubc | ° C. | 0 | 0 | 0 |
| EFF_expn |  | 0.85 | 0.85 | 0.85 |
| EFF_comp |  | 0.85 | 0.85 | 0.85 |
| Pevap | MPa | 1.35 | 1.63 | 1.94 |
| Pcond | MPa | 0.14 | 0.18 | 0.22 |
| Texpn_out | ° C. | 70.87 | 68.04 | 63.37 |
| EFF_thermal |  | 0.1333 | 0.1327 | 0.1327 |
| CAP_e (Volumetric Capacity for power generation) | kJ/m$^3$ | 253.39 | 306.31 | 362.55 |

Example G

Transcritical ORC with HFO-1336mzz-E

Table G compares the performance transcritical ORCs with HFO-1336mzz-E, HFO-1336mzz-Z, a 50/50 wt % blend of HFO-1336mzz-E and HFO-1336mzz-Z, and HFC-245fa.

TABLE G transcritical ORC performance with HFO-1336mzz-E

|  | units | HFO-1336mzz-Z | HFC-245fa | HFO-1336mzz-E | HFO-1336mzz-E/HFO-1336mzz-Z 50/50 wt % |
|---|---|---|---|---|---|
| P heater | MPa | 4 | 4 | 4 | 4 |
| Texpn_in | ° C. | 200 | 200 | 200 | 200 |
| Tcond | ° C. | 35 | 35 | 35 | 35 |
| ΔTsubc | ° C. | 0 | 0 |  |  |
| EFF_expn |  | 0.85 | 0.85 | 0.85 | 0.85 |
| EFF_comp |  | 0.85 | 0.85 | 0.85 | 0.85 |
| Pcond | MPa | 0.11 | 0.21 | 0.27 | 0.18 |
| EFF_thermal |  | 0.176 | 0.165 | 0.153 | 0.163 |
| CAP_e (Volumetric Capacity for power generation) | kJ/m$^3$ | 278.46 | 479.4 | 5554.93 | 416.73 |

From the data it has been demonstrated that HFO-1336mzz-Z and mixtures thereof with HFO-1336mzz-E provide efficiencies close to that of HFC-245fa. Additionally, adding HFO-1336mzz-E to HFO-1336mzz-Z allows the use of such mixture which may provide a volumetric capacity for power generation to approach that for HFC-245fa, while providing a more environmentally sustainable working fluid for the industry.

What is claimed is:

1. A process for recovering heat from a heat source and generating mechanical energy, comprising the steps of:
   (a) compressing a first working fluid in liquid phase to a pressure above said first working fluid's critical pressure;
   (b) passing said first working fluid from Step (a) through a heat exchanger or a fluid heater and heating said first working fluid to a temperature that is higher or lower than the critical temperature of said first working fluid, wherein said heat exchanger or said fluid heater is in communication with said heat source that supplies said heat;
   (c) removing at least a portion of the heated said first working fluid from said heat exchanger fluid heater;
   (d) passing said at least a portion of the heated said first working fluid to an expander, wherein at least portion of said heat is converted into mechanical energy, and wherein the pressure on said at least a portion of the heated said first working fluid is reduced to below the critical pressure of said first working fluid, thereby rendering said at least a portion of the heated said first working fluid to a first working fluid vapor or a first working fluid mixture of vapor and liquid;
   (e) passing said first working fluid vapor or said first working fluid mixture of vapor and liquid from said expander to a condenser, wherein said first working fluid vapor or said first working fluid mixture of vapor and liquid is fully condensed to the first working fluid in liquid phase;
   wherein said first working fluid consists of HFO-1336mzz-Z; and wherein the working fluid in step (a) is compressed to a pressure within the range from 3 MPa to 6 MPa and said expander in step (d) operates at an inlet temperature of 200° C. to 400° C.

2. The process as recited in claim 1, wherein the efficiency of converting heat to mechanical energy (cycle efficiency) is at least 7%.

3. The process as recited in claim 1, wherein the temperature to which the first working fluid is heated in Step (b) is in the range of from 50° C. to 400° C.

4. The process as recited in claim 1 wherein said first working fluid has a GWPs of less than 35.

5. The process as recited in claim 1, wherein said process that produces heat is at least one operation associated with at least one industry selected from the group consisting of: oil refineries, petrochemical plants, oil and gas pipelines, chemical industry, commercial buildings, hotels, shopping malls, supermarkets, bakeries, food processing industries, restaurants, paint curing ovens, furniture making, plastics molders, cement kilns, lumber kilns, calcining operations, steel industry, glass industry, foundries, smelting, air-conditioning, refrigeration, and central heating.

6. The process as recited in claim 1, further comprising a secondary heat exchanger loop disposed between said heat exchanger in step (a) and said process which produces said heat.

7. The process as recited in claim 6, wherein said secondary heat exchanger loop comprises passing a secondary fluid in communication with both said heat exchanger and said process which produces said heat, thereby transferring said heat from said process to said secondary fluid which thereafter transfers said heat from said secondary fluid to said first working fluid in liquid phase.

8. The process as recited in claim 7, wherein said secondary fluid comprises at least one high-boiling point fluid having a boiling point of 150° C. or higher.

9. The process as recited in claim 8, wherein said secondary fluid is at least one selected from the group consisting of: glycols and silicones.

10. The process as recited in claim 1, wherein said expander in step (d) operates at an inlet temperature of 200° C. to 300° C.

11. The process as recited in claim 1, wherein said expander in step (d) operates at an inlet temperature of 200° C. to 250° C.

12. The process as recited in claim 1, wherein said expander in step (d) operates at an inlet temperature of 225° C.

13. An Organic Rankine Cycle System for extracting heat, containing a working fluid, wherein the system comprises a pump that elevates the pressure of the working fluid to a pressure in the range of 3 MPa to 6 MPa, a heat supply heat exchanger in thermal communication with a heat source, an expander operating at an inlet temperature of 200° C. to 400° C., and a condenser, wherein said working fluid consists of HFO-1336mzz-Z.

14. The Organic Rankine Cycle System of claim 13 wherein the expander operates at an inlet temperature of 200° C. to 300° C.

15. The Organic Rankine Cycle System of claim 13 wherein the expander operates at an inlet temperature of 200° C. to 250° C.

16. The Organic Rankine Cycle System of claim 13 wherein the expander operates at an inlet temperature of 225° C.

* * * * *